US007624709B2

(12) United States Patent
Cao

(10) Patent No.: US 7,624,709 B2
(45) Date of Patent: Dec. 1, 2009

(54) CAO CYCLES OF INTERNAL COMBUSTION ENGINE WITH INCREASED EXPANSION RATIO, CONSTANT-VOLUME COMBUSTION, VARIABLE COMPRESSION RATIO, AND COLD START MECHANISM

(76) Inventor: Yiding Cao, 16302 SW. 68 Ter., Miami, FL (US) 33193

( * ) Notice: Subject to any disclaimer, the term of this patent is extended or adjusted under 35 U.S.C. 154(b) by 476 days.

(21) Appl. No.: 11/716,844

(22) Filed: Mar. 12, 2007

(65) Prior Publication Data

US 2007/0295290 A1    Dec. 27, 2007

Related U.S. Application Data

(60) Provisional application No. 60/815,487, filed on Jun. 21, 2006.

(51) Int. Cl.
*F02B 75/02*     (2006.01)
*F02B 23/00*     (2006.01)
(52) U.S. Cl. .......................... 123/64; 123/48 D; 123/21; 123/258
(58) Field of Classification Search ............... 123/48 D, 123/78 D, 21, 258, 64
See application file for complete search history.

(56) References Cited

U.S. PATENT DOCUMENTS

| 4,369,747 | A | * | 1/1983 | Jahoda | 123/278 |
| 4,799,465 | A | * | 1/1989 | Yanagisawa et al. | 123/256 |
| 4,809,511 | A | * | 3/1989 | Bajulaz | 60/712 |
| 4,875,445 | A | * | 10/1989 | Imoto et al. | 123/292 |
| 5,115,775 | A | * | 5/1992 | Gruenwald | 123/292 |
| 5,195,469 | A | * | 3/1993 | Syed | 123/48 A |
| 5,237,964 | A | * | 8/1993 | Tomoiu | 123/25 C |

* cited by examiner

*Primary Examiner*—Stephen K Cronin
*Assistant Examiner*—J. Page Hufty

(57) ABSTRACT

This invention provides an internal combustion engine that has a substantially increased expansion ratio, a variable compression ratio, and subsequently a significantly improved thermal efficiency. This improvement in thermal efficiency is attained without involving a complex mechanical structure or an enlarged engine size. The engine comprises at least a piston and cylinder assembly including a piston reciprocatingly mounted within the cylinder space, and at least two combustion chambers associated with said cylinder, each said combustion chamber having a port leading to said cylinder space and a combustion-chamber valve, said valve opens and closes said port to establish or block the communication between said combustion chamber and cylinder space, wherein said internal combustion engine is adapted to operate on preferred cycles in accordance with load conditions to substantially increase the engine's expansion ratio or provide a variable compression ratio mechanism under part load conditions. For an engine having two combustion chambers associated with each cylinder, the expansion ratio or compression ratio may be nearly doubled. Additionally, a cold start mechanism particularly for an engine operating on alternative fuels, such as ethanol or methanol, and engine valves that are operationally suitable for the engine cycles in accordance with the present invention are disclosed.

26 Claims, 9 Drawing Sheets

CAO CYCLES OF INTERNAL COMBUSTION ENGINE WITH INCREASED EXPANSION RATIO, CONSTANT-VOLUME COMBUSTION, VARIABLE COMPRESSION RATIO, AND COLD START MECHANISM

CROSS REFERENCES TO RELATED APPLICATIONS

This application is a continuation of provisional application 60/815,487 filed Jun. 21, 2006.

FIELD OF INVENTION

This invention relates to internal combustion engines operating on preferred cycles to attain a substantially increased expansion ratio, variable compression ratio mechanism, constant-volume combustion, or successful cold start.

BACKGROUND

It is well known that an internal combustion engine having an expansion ratio larger than the compression ratio will have a higher thermal efficiency. An engine with such a feature was first taught by Atkinson and was termed as the Atkinson cycle. In an Atkinson cycle, combustion gas continues to expand within the cylinder to the atmospheric pressure. Various mechanisms aimed to realize the Atkinson cycle were proposed or developed. However, many of these Atkinson-cycle based engines may involve a complex mechanical structure and bulky size, which may result in a mechanical weakness.

An alternative to the Atkinson cycle is the Miller cycle through early or late closing of the intake valve to decrease the compression ratio. The Miller cycle differs from the Atkinson cycle in that the engine's structure remains the same as that of an engine operating on a conventional four-stroke cycle. With an engine under part load conditions, the Miller cycle may have the benefit of reducing the pumping losses by eliminating the charge throttling. One common practice of evaluating the performance of a Miller cycle is to consider its performance similar to the Atkinson cycle. In this evaluation, the Miller cycle's reduced compression ratio due to the early or late closing of the intake valve was used against the engine's expansion ratio, and it was claimed that the Miller cycle would have a thermal efficiency equivalent to that of the Atkinson cycle. According to this evaluation, a Miller cycle therefore would have a thermal efficiency higher than that of a conventional cycle, such as an Otto cycle or diesel cycle. This comparison may be confusing, however, because the calculation is based on the decreased compression ratio for both Miller and conventional cycles. It is well known that a larger compression ratio will provide a higher thermal efficiency. As a result, an engine operating on a conventional cycle without throttling, with its compression ratio being equal to the engine's full compression ratio, may in fact have a higher thermal efficiency than that operating on a Miller cycle.

Another technique that may substantially increase the engine's thermal efficiency is the variable compression ratio mechanism. It is well known that the compression ratio in an engine design is determined largely based on the knock threshold at the wide-open throttle condition. However, this knock threshold may not be applicable to a part throttle condition when an engine is under part-load conditions, which may allow a higher compression ratio to increase the engine's thermal efficiency. Since majority of an engine's operating time would occur under part load conditions, there is a strong incentive to enable a variable compression ratio mechanism in the engine design. Many techniques that may enable a variable compression ratio have been proposed or developed. These techniques may vary the compression ratio by moving crankshaft axis, varying the piston stroke, moving the cylinder head, varying the combustion chamber volume, modifying connecting rod geometry, moving the crankpin within the crankshaft, or varying the piston deck height. However, so far no engine implementing any of these variable compression ratio techniques mentioned above has reached the production level.

Yet another issue facing the internal combustion engine industry is the cold start problem particularly in connection with alternative fuels such as ethanol and methanol. Although ethanol and methanol are considered to be renewable and their utilization has been promoted as the fuel of future, an internal combustion engine operating on ethanol or methanol would normally encounter cold-start problems, due to their large latent heat and lower vaporization rate. Over the years, many techniques have been considered to overcome the cold start problem. These techniques include gasoline pilot start, onboard distillation systems, glow-plug ignited fuel systems, electric superchargers, quick-heating of intake manifold, liquid-heated fuel injector rails, and phase-changing catalysts. Although some of these techniques may be able to solve the cold start problem, they may have the disadvantages of increasing the complexity of the engine system, causing inconvenience of consumers, or taking a long period of time to start the engine.

SUMMARY OF THE INVENTION

It is therefore an objective of this invention to provide an internal combustion engine having a substantially increased expansion ratio and subsequently a significantly improved thermal efficiency. This improvement is attained without involving a complex mechanical structure or an enlarged engine size, and at the same time without reducing the compression ratio. Said engine comprises at least a piston and cylinder assembly including a piston reciprocatingly mounted within the cylinder space, and at least two combustion chambers associated with said cylinder, each said combustion chamber having a port leading to said cylinder space and a combustion-chamber valve, said valve opens and closes said port to establish or block the communication between said combustion chamber and cylinder space, wherein said internal combustion engine is adapted to operate on a cycle having 2n+2 essential strokes, where n is the number of combustion chambers associated with each cylinder. Said 2n+2 essential strokes include a first intake stroke for the combustion chambers, wherein an amount of charge is admitted into said cylinder space, a second compression stroke for the combustion chambers, wherein said charge is compressed to an elevated pressure within the combustion chambers. The remaining strokes in the cycle are divided and evenly assigned to each combustion chamber. Each said combustion chamber has a power stroke, wherein hot combustion gases from said combustion chamber expand in the cylinder space against the piston, and an exhaust stroke following the power stroke, wherein exhaust gases are discharged out of said cylinder space. Although theoretically n may be any integral number, practically n may be limited to 2 or 3 for most applications.

According to the cycle set forth above, the expansion ratio may be nearly doubled compared to the compression ratio when n=2. Another objective of this invention is to provide a variable compression ratio mechanism based on the above engine platform when the engine operates under part load conditions, said variable compression ratio mechanism being attained by deactivating one or more of the combustion chambers, or early closing one or more combustion chambers during the compression stroke.

Yet another objective of this invention is to provide a cold start mechanism particularly for an engine operating on alternative fuels such as ethanol or methanol, said engine comprising at least a piston and cylinder assembly including a piston reciprocatingly mounted within the cylinder space, and a holding chamber associated with said cylinder space, said holding chamber having a port leading to said cylinder space and a holding-chamber valve, said valve opens and closes said port to establish or block the communication between said holding chamber and cylinder space. The cold start is attained through the expansion of the charge in a low pressure cylinder space and subsequent re-compression after the intake stroke and first compression stroke. In practice, said holding chamber may be a prechamber with a throat valve that may open or close the access of the prechamber to the cylinder space. It is understandable that the prechamber herein may be the prechamber in an indirect injection diesel engine or the divided chamber in a spark-ignition engine.

A further objective of this invention is to provide combustion under constant-volume for both single combustion chamber and multiple combustion chambers associated with each piston and cylinder assembly. Still a further objective of this invention is to introduce engine valves that are operationally suitable for the engine cycles in accordance with the present invention.

DETAILED DESCRIPTION

Figure 1:
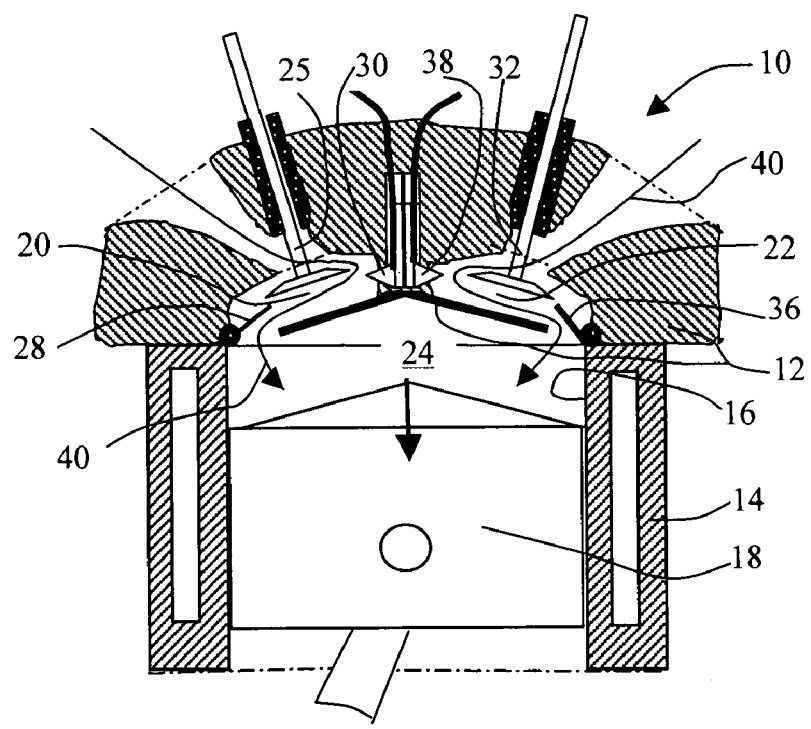
FIG. 1 is a schematic vertical sectional view of an internal combustion engine unit in accordance with the present invention, illustrating the arrangement of two combustion chambers as well as the positions of valves and piston during an intake stroke for both combustion chambers.
Figure 2A:
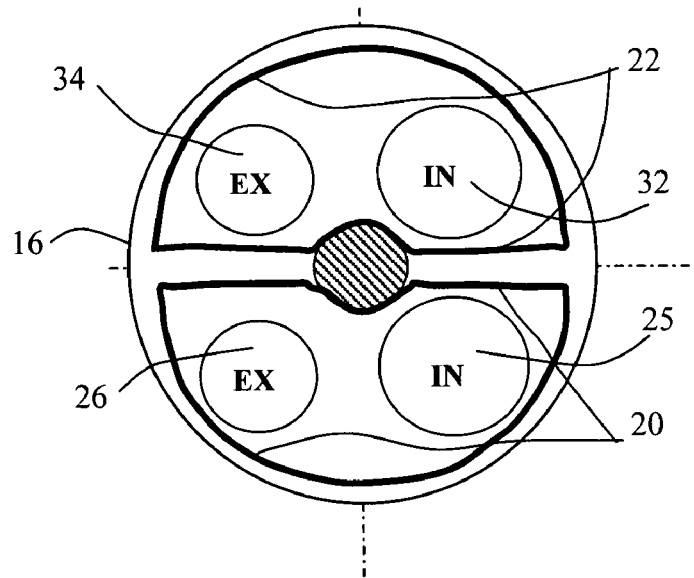
FIG. 2a is a schematic top sectional view of an internal combustion engine unit in accordance with the present invention, illustrating the arrangements of the combustion chambers and valves.
Figure 2B:
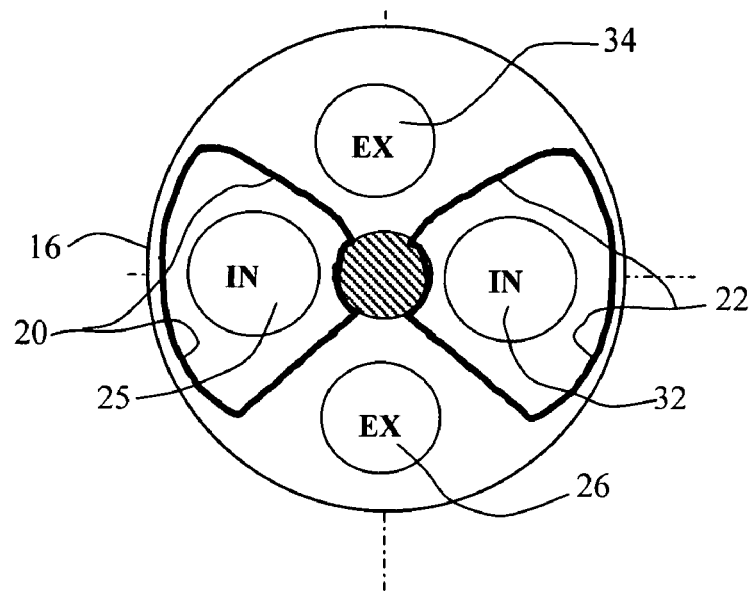
FIG. 2b is a schematic top sectional view of an internal combustion engine unit in accordance with the present invention, illustrating another arrangement of the combustion chambers and valves, wherein exhaust valves are shared by the two combustion chambers.

FIG. 1 illustrates an internal combustion engine 10 in accordance with the present invention, which includes a cylinder head 12 and an engine block 14. Engine block 14 contains at least a cylinder 16 and a piston 18 that is slidably disposed within the cylinder 16. Associated with each engine cylinder 16, cylinder head 12 defines a first combustion chamber 20 and a second combustion chamber 22. When piston 18 reaches the top dead center (TDC), cylinder space 24, as defined by the bottom face of the cylinder head 12, the top face of the piston 18, and the sidewall of the cylinder 16, will be minimized. The first combustion chamber 20 may be provided with an opening to an intake port and an opening to an exhaust port. The intake port has an intake valve 25, and the exhaust port has an exhaust valve 26, as shown in FIG. 2a, which is a top sectional view of the internal combustion engine unit, illustrating the arrangements of the combustion chambers and valves. It should be mentioned that the arrangement as shown in FIG. 2a is one of many possible options depending upon design conditions such as the size of the engine as well as thermal and structural considerations. FIG. 2b illustrates another option in connection with the arrangement of the combustion chambers and intake and exhaust valves. In this option, the exhaust valves are disposed outside of the combustion chambers and shared by two combustion chambers. Additionally, the first combustion chamber 20 is provided with an opening port to cylinder 16. The opening port may be opened or closed by a combustion-chamber valve 28 (FIG. 1). The valve 28 as illustrated herein is schematic in nature; it may be, but not limited to, a puppet valve, slide valve, rotary valve, butterfly valve, switch valve, gate valve, or ball valve. For a spark-ignition or homogenous charge combustion engine, the first combustion chamber is also provided with an ignition means 30. Or for a compression-ignition combustion engine, the first combustion chamber is provided with a fuel injector device 30. Similarly, the second combustion chamber 22 is provided with an intake valve 32, an exhaust valve 34, a combustion chamber valve 36, and an ignition device or fuel injector 38, as shown in FIG. 1, FIG. 2a or FIG. 2b. For a homogenous charge compression ignition (HCCI) engine, however, the inclusion of 30 and 38 may not be necessary. Unlike a conventional internal combustion engine, which normally works on a four-stroke cycle or a two-stroke cycle, the engine according to the present invention may be adapted to work on a six-stroke cycle. It is apparent to one skilled in the art that the engine described herein may include numerous additional components (not described herein), which are common to a conventional engine operating on an Otto-type cycle or a diesel-type cycle. The operation of a spark-ignition or homogeneous charge engine as well as a compression-ignition engine in accordance with the present invention is described in detail with reference to FIGS. 1-7.

FIG. 1 illustrates representative conditions for the first stroke of the cycle, which is the intake stroke for both first and second combustion chambers. In this case, the intake valve 25 and chamber valve 28 associated with the first combustion chamber 20 and the intake valve 32 and chamber valve 36 associate with the second combustion chamber 22 are all open, while both exhaust valves 26 and 34 are closed. Piston 18 moves downwardly, admitting an amount of charge 40 into the cylinder 16.

Figure 3:
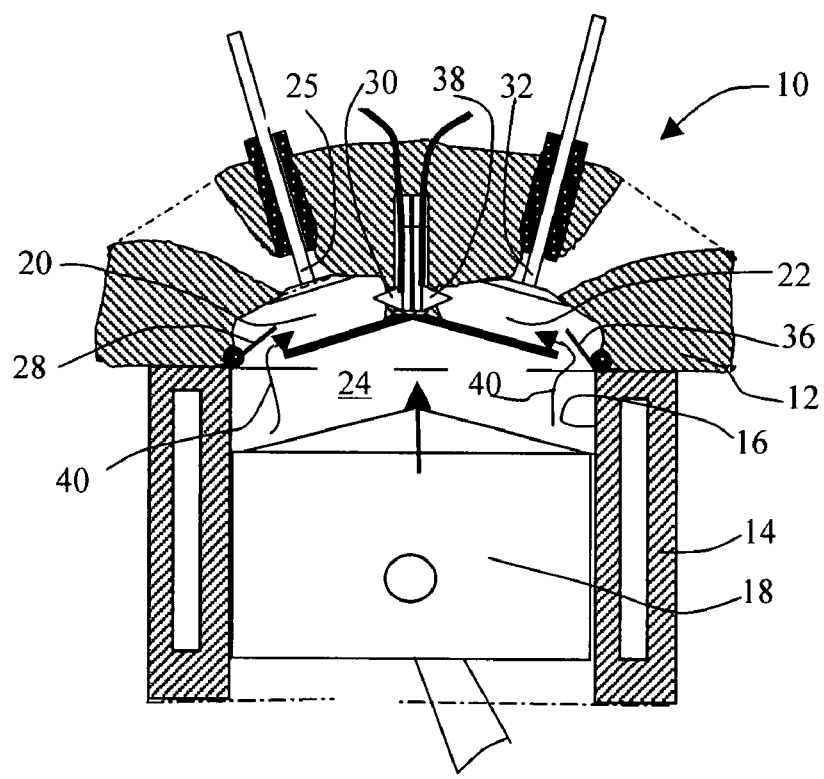
FIG. 3 is a schematic vertical sectional view of an internal combustion engine unit in accordance with the present invention, illustrating the positions of the valves and piston during a compression stroke for both combustion chambers.

FIG. 3 illustrates representative conditions for the second stroke, which is the compression stroke for both the first and second combustion chambers. In this case, intake valves 25 and 32 as well exhaust valves 26 and 34 are all closed while both combustion chamber valves 28 and 36 remain open. Piston 18 moves upwardly, compressing charge 40 into both combustion chambers to a higher pressure and a higher temperature.

Figure 4:
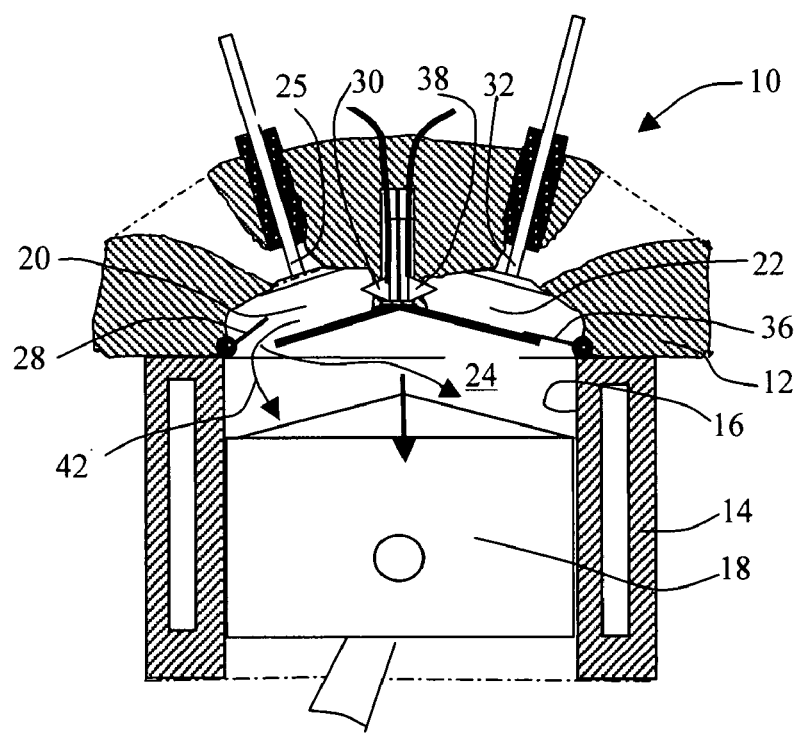
FIG. 4 is a schematic vertical sectional view of an internal combustion engine unit in accordance with the present invention, illustrating the positions of the valves and piston during the power stroke for the first combustion chamber.

FIG. 4 illustrates representative conditions for the third stroke, which is the power stroke for the first combustion chamber 20. In this case, all the intake and exhaust valves (25, 26, 32, and 34) as well as the chamber valve 36 associated with the second combustion chamber 22 are closed. The charge previously entering the second combustion chamber 22 in the compression stroke is being held within the same chamber. For the first combustion chamber 20, chamber valve 28 remains open. For a homogenous charge engine the combustible mixture in the first combustion chamber 20 was ignited in a predetermined timing by spark plug 30 and explosive combustion occurred. Or for a compression-ignition engine an amount of fuel was injected into the compressed air in chamber 20 through fuel injector 30 in a suitable timing, and combustion occurred due to auto ignition. The high pressure, high temperature gases 42 expand into cylinder 16, pushing piston 18 and delivering work to it.

Figure 5:
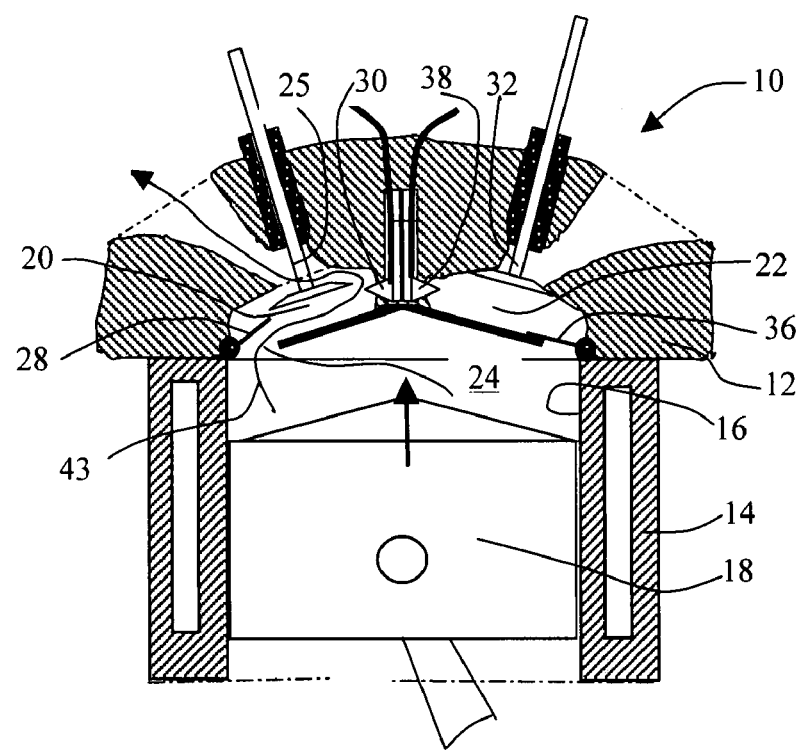
FIG. 5 is a schematic vertical sectional view of an internal combustion engine unit in accordance with the present invention, illustrating the positions of the valves and piston during the exhaust stroke for the first combustion chamber.

FIG. 5 illustrates representative conditions for the fourth stroke, which is the exhaust stroke for the first combustion chamber 20. All the valves associated with the second combustion chambers 22 remain closed, and the charge previously entering the chamber 22 in the compression stroke is still being enclosed within the same chamber. For the first combustion chamber 20, the chamber valve 28 remains open. Exhaust valve 26 is opened for the arrangement as shown in FIG. 2a, and both exhaust valves 26 and 34 are opened for the arrangement as shown in FIG. 2b. Exhaust gases 43 are being discharged out of the cylinder.

Figure 6:
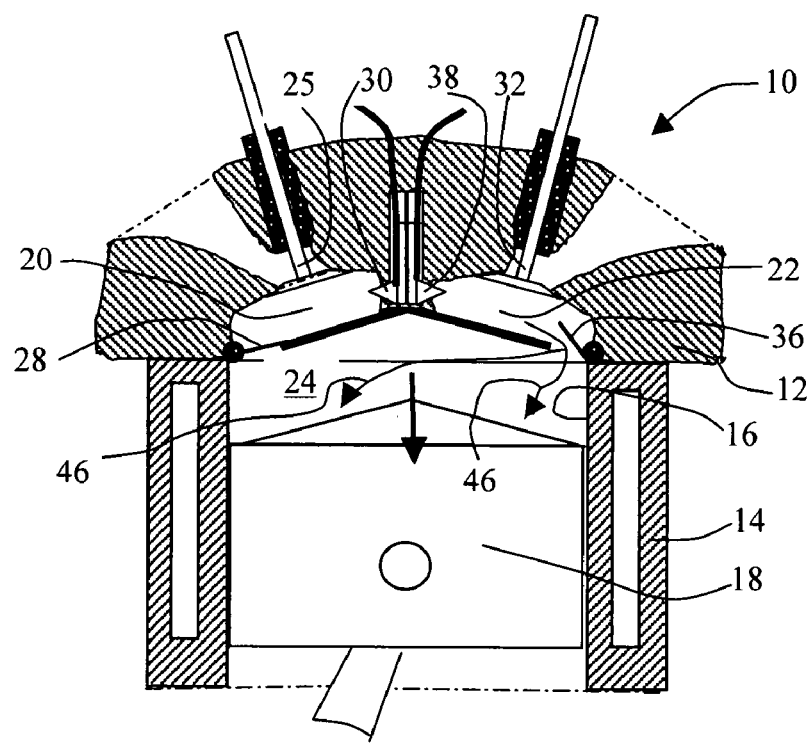
FIG. 6 is a schematic vertical sectional view of an internal combustion engine unit in accordance with the present invention, illustrating the positions of the valves and piston during the power stroke for the second combustion chamber.

FIG. 6 illustrates representative conditions for the fifth stroke, which is the power stroke for the second combustion chamber 22. In this case, chamber valve 36 is opened while all other valves are closed with the exception that exhaust valve 26 or intake valve 25 related to the arrangement as shown in FIG. 2a may not necessarily be subject to this requirement. For a homogeneous charge engine the combustible mixture previously being held in the second chamber 22 was ignited in a predetermined timing by spark plug 38 and explosive combustion occurred. Or for a compression-ignition engine an amount of fuel was injected into the compressed air previously being held in the second chamber 22 through fuel injector 38 in a suitable timing, and combustion occurred due to auto ignition. The high pressure, high temperature gases 46 expand into cylinder 16, pushing piston 18 and delivering work to it.

Figure 7:
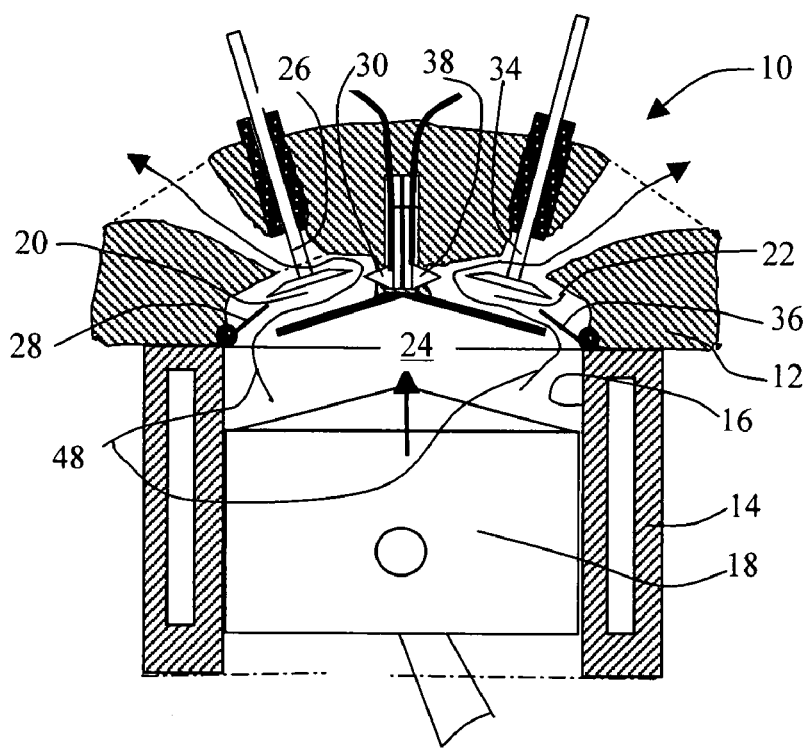
FIG. 7 is a schematic vertical sectional view of an internal combustion engine unit in accordance with the present invention, illustrating the positions of the valves and piston during the exhaust stroke for the second combustion chamber.

FIG. 7 illustrates representative conditions for the sixth stroke, which is the exhaust stroke for the second combustion chamber 22. For the arrangement as shown in FIG. 2a, exhaust valve 34 is opened, and exhaust gases 48 are being discharged from cylinder 16 into exhaust port through chamber 22. Chamber valve 28 and exhaust valve 26 may optionally be opened to aid the discharge of the exhaust gases from cylinder 16, as shown in FIG. 7. For the arrangement as shown in FIG. 2b, however, both exhaust valves are opened to discharge the exhaust gas out of the cylinder space while both first and second combustion chambers may be closed when the exhaust pressure in the cylinder space has dropped to a value closed to the ambient pressure to reduce the exhaust gas heating on the combustion chamber walls (not shown).

One skilled in the art may readily recognize that the six strokes described above are essential strokes in a cycle according to the present invention. In fact, an engine may be adapted to operate on a cycle having any number of strokes. Non-essential strokes to this invention may be added before the first stroke and after the sixth stroke, or be inserted among the six strokes mentioned above. For example, two non-essential strokes related to the first combustion chamber may be inserted between the first exhaust stroke and the second power stroke.

The operational benefit of the above described cycle is very significant; the expansion ratios in the two power strokes are almost doubled while the compression ratio remains the same. Assuming that the two combustion chambers have the same interior volume and contain the same amount of charge at the end of compression stroke, the gas leakage through the enclosed combustion chamber is negligible, and the charge left in the cylinder space 24 is very small when the piston reaches the top dead center, the expansion ratio of the first power stroke, $r_e$, is $$r_e = (V_d + V_{tdc,1})/V_{tdc,1} = (V_d + 0.5V_c)/(0.5V_c)$$
$$= (V_d/V_c + 0.5)/0.5$$
$$= ((V_d + V_c - V_c)/V_c + 0.5)/0.5 = (r_c - 1 + 0.5)/0.5$$
$$= (r_c - 0.5)/0.5$$

where $V_{tdc,1}$ is the gas volume in the first combustion chamber when the piston is at its top dead center, $V_d$ is the piston displaced volume or swept volume, $V_c$ is the clearance volume associated with both combustion chambers when the piston is at its top dead center, and $r_c$ is the engine's compression ratio, which is $(V_d+V_c)/V_c$. Consider a gasoline engine that has a compression ratio of 9, the expansion ration from the above equation would be $$r_e=(9-0.5)/0.5=17$$

The result indicates that the engine's expansion ratio is almost doubled. This is also true for the second power stroke related to the second combustion chamber. With this operational feature, the improvement in engine's thermal efficiency can be easily calculated. Although the exact number would differ depending on the level of sophistication of the model to be used, the improvement in the thermal efficiency would be amounted to about 20%.

Next, the indicated mean effective pressure (imep) of the engine according to the present invention is evaluated. Here the indicated mean effective pressure (imep) is defined as the indicated work per cycle divided by the cylinder volume displaced by the piston per cycle. Consider first a conventional engine working on a four-stroke cycle with an $imep_o$ as evaluated by the following relation:

$$imep_o = W_o/V_{d,o}$$

where $W_o$ is the indicated work per cycle of a conventional engine and $V_{d,o}$ herein is defined as the cylinder volume displaced by the piston per cycle. For the engine according to the present invention, having the same size and burning the same amount of fuel in a cycle, with an indicated work per cycle, W, and the cylinder displaced volume per cycle, $V_d$, the imep is $$imep=W/V_d$$

Note that the present engine is operating on a six-stroke cycle and the thermal efficiency of the present engine is 20% higher. Therefore $$V_{d,o}/V_d=4/6=2/3,\ W/W_o=1.2$$

As a result, the reduction in imep for the present engine is $$(imep_o - imep)/imep_o = (W_o/V_{d,o} - W/V_d)/(W_o/V_{d,o})$$
$$= 1 - (W/W_o)(V_{d,o}/V_d)$$
$$= 1 - (1.2)(2/3) = 0.2$$

The result indicates that the reduction in the indicated mean effective pressure is only about 20% compared to a conventional four-stroke cycle.

It is understandable that in a situation in which the maximum power output is the top priority, such as the case during the quick acceleration of a vehicle, the engine may return to the four-stroke cycle operation by simply opening both combustion-chamber valves at all times with a sacrifice in fuel efficiency.

One skilled in the art will readily recognize that the common practices of variable valve timing and lift as well as valve overlap periods will be still applicable to the operation of the intake and exhaust valves in the present invention. Similarly, in the context of the discussion on the combustion-chamber valves, such as valves 28 and 36, early/late opening or early/late closing as well as valve overlap periods may be common practices for an internal combustion engine according to the present invention. In connection with combustion chamber valves, early/late opening or early/late closing of a combustion chamber may also be common practices according to the present invention.

It is understandable that the timings of opening or closing combustion-chamber valves, such as 28 and 36, as well as the timings of combustion ignition will be important to the operation of an engine. Although the timings of the combustion-chamber valves and the combustion ignition may be set based on any desired operational consideration, two of the most important operational considerations are the structural/thermal consideration and cleaner burning/higher power output consideration. In the structural/thermal consideration, the engine's operation is limited by the predetermined maximum combustion gas pressure or temperature. In this case, early closing of the chamber valve 28 and early opening of the chamber valve 36 during the exhaust stroke for the first combustion chamber 20 may be selected, so that the second combustion chamber 22 may be largely in communication with cylinder space 24 during the combustion period of chamber 22. Additionally, the charge ignition or fuel injection timing for the charge in the second combustion chamber may be set close to the end of the first exhaust stroke related to the first combustion chamber, so that an excessive pressure rise in the second combustion chamber or a prolonged high temperature heating period on the combustion chamber wall may be avoided.

For the second consideration, cleaner burning and higher power output are the priority of the operation. The ignition or fuel injection for the second combustion chamber may be set at an earlier time, so that the combustion in the second combustion chamber 22 is substantially complete and the gas pressure rose to the maximum before the chamber valve 36 is opened. Because of a longer combustion time period and the closed-chamber combustion, which enables combustion under a constant volume, the combustion in chamber 22 may be cleaner and the peak gas pressure in the cycle would be higher compared to the operation of a conventional four-stroke cycle engine.

One skilled in the art may recognize that the operation of chambers 20 and 22 may be asymmetric. The temperature of chamber 22 may be lower than the temperature of chamber 20 when the timings for chamber valves and charge ignition/fuel injection are set for the structural/thermal consideration. On the other hand, the temperature of chamber 22 may be higher than the temperature of chamber 20 when the timings of ignition (or fuel injection) and chamber valves are set for the consideration of cleaner burning/higher power output under constant-volume combustion conditions. This asymmetric condition may be eliminated by interchanging the roles of the first and second combustion chambers in the succeeding six-stroke cycle through an electronic control unit. For example, after the completion of the six-stroke as described earlier, chamber 20 may become a holding chamber in the third and fourth strokes in lieu of the function of chamber 22 in the next six-stroke cycle.

It should be pointed out that the maximum operation pressures in the first and second combustion chambers may not be the same because the combustion in the first combustion, according to the previous discussion, is largely open chamber combustion while the combustion in the second combustion chamber may be closed chamber combustion under the consideration of cleaner burning and higher power output. The difference in the maximum combustion pressure may be substantially reduced through the following procedure. It is apparent to one skilled in the art that the interior volumes of the two combustion chambers may not necessarily be equal and they may be sized to meet the requirements for preferred engine performance. Similarly, two combustion chambers may operate at different compression ratios. For example, during the compression stroke the second combustion chamber valve 36 may close earlier before the piston reaches the top dead center, and the charge left in the cylinder is then completely compressed into the first combustion chamber, which results in a lower charge pressure in the second combustion chamber and a higher charge pressure in the first combustion chamber. This charge pressure difference between the two combustion chambers is operationally beneficial when the burning in the second chamber is under a closed-chamber condition, and the burning in the first combustion chamber is under an open-chamber combustion. Because of the tendency of raising combustion gas pressure under a closed-chamber or constant-volume condition, the lower charge pressure in the second combustion chamber before the burning may be more than compensated. On the other hand, because the open-chamber combustion has the tendency of reducing peak combustion pressure, the higher charge pressure before the burning would compensate a lower peak pressure in the combustion process.

The description of the operational advantage of an internal combustion engine according to the present invention so far focuses mainly on the increase in expansion ratio. Additional description is needed for the advantage of the closed-chamber combustion that is made possible by the present invention, such as the closed-chamber combustion option for the second combustion chamber in connection with the two-combustion chamber configuration of FIGS. 1-7. The closed-chamber combustion, which enable combustion at constant volume, has numerous operational benefits that include, among others, avoiding power loss related to early fuel ignition or fuel injection before the piston reaches the top dead center in the compression stroke, having a shorter warm-up time and a longer combustion time for the fuel, which would result in a more complete combustion (These characteristics may be particularly important to a diesel engine or an internal combustion engine operating on alternative fuels such as ethanol and methanol that have a large latent heat or a slow vaporization rate), providing a higher combustion gas pressure at the start of the power stroke which would result in an increased power delivery, avoiding quenching combustion flame due to the contact of the combustion gas with cooler piston and cylinder wall in the power stroke, and reducing the possibility of a knock occurrence so that the engine could tolerate a higher compression ratio for a homogenous charge combustion engine.

The six essential stroke cycle in connection with the illustrations in FIGS. 1-7 may enable closed-chamber combustion for the second combustion chamber but not for the first combustion chamber. To enable closed-chamber combustion for both the second and first chambers, the engine may operate on a cycle including eight essential strokes through the modification of the afore-described six essential stroke cycle. These eight essential strokes include (1) an intake stroke, in which an amount of charge is admitted into the cylinder, (2) a compression stroke for both first and second combustion chambers, in which the charge is compressed to an elevated pressure within both combustion chambers, (3) when the piston is in the vicinity of the top dead center, both combustion chambers are closed and enclose the charge within the chambers. Then the compression stroke is followed by two additional strokes, wherein the piston moves from the top dead center to the bottom dead center and returns from the bottom dead center to the top dead center. Alternatively, these two additional strokes may act as, respectively, the power stroke and exhaust stroke for the charge left outside of the two closed combustion chambers (In general, it is preferable that the charge left outside of the two combustion chambers be minimized when the piston is at the top dead center. However, for certain engine designs, if the charge remaining outside of the combustion chambers is not very small, a three chamber phenomenon may be considered for the description as shown in FIGS. 1-7). During the time period of the two additional strokes, combustion takes place at least in the first combustion chamber, (4) a first power stroke for the first combustion chamber, as high pressure, high temperate gases from the first combustion chamber deliver work to the piston while the second combustion chamber is closed, (5) an exhaust stroke for the first combustion chamber, in which exhaust gases are discharged out of the cylinder space, while the second combustion chamber is closed. During the time period of the two additional strokes or the time period of the power and exhaust strokes for the first combustion chamber, combustion takes place in the second combustion chamber, (6) a second power stroke for the second combustion chamber, as high pressure, high temperate gases from the second combustion chamber deliver work to the piston while the first combustion chamber is closed, and (7) an exhaust stroke for the second combustion chamber, in which exhaust gases are discharged out of the cylinder. In this eight essential stroke cycle, both combustion chambers are given at least a 360 degree crank angle for combustion under closed-chamber conditions, which should be adequate for complete combustion for most spark-ignition or compression ignition engines. The penalty for this arrangement is the reduction in brake mean effective pressure. However, this reduction may not be an issue under part load conditions because some of the cylinders may anyway be deactivated. As the power demand is further reduced under part load conditions, the number of the additional strokes inserted between the compression stroke and the first power stroke may be greater than two.

During the quick acceleration of a vehicle, the above-described eight-stroke cycle may have difficulty in delivering a large amount of work over a short time period. In this case, the engine may be adapted to operate on a different eight-stroke cycle having two intake strokes and two compression strokes without the benefit of increasing the expansion ratio, but maintaining the feature of closed-chamber combustion. These eight strokes may include (1) a first intake stroke, wherein an amount of charge is admitted into the cylinder space, (2) a first compression stroke for the first combustion chamber following the first intake stroke, wherein charge is compressed to an elevated pressure within the first combustion chamber, (3) a second intake stroke for the second combustion chamber following the compression stroke for the first combustion chamber, wherein an amount of charge is admitted into said cylinder space, while the first combustion chamber is closed and encloses the charge entering the first combustion chamber in the first compression stroke, (4) a second compression stroke for the second combustion chamber following the second intake stroke, wherein said charge is compressed to an elevated pressure within the second combustion chamber, while the first combustion chamber is closed. During the time period of the second intake and second compression strokes, combustion takes place in the first combustion chamber, (5) a first power stroke for the first combustion chamber following the second compression stroke, wherein high pressure, high temperature gases from the first combustion chamber expand in the cylinder space and deliver work to the piston, while the second combustion chamber is closed and encloses the charge entering the second combustion chamber in the second compression stroke, (6) a first exhaust stroke for the first combustion chamber following the first power stroke, wherein exhaust gases are discharged out of the cylinder while the second combustion chamber is closed. During the time period of the first power and first exhaust strokes, combustion takes place in the second combustion chamber, (7) a second power stroke for the second combustion chamber following the first exhaust stroke, wherein high pressure, high temperature combustion gases from the second combustion chamber expand in the cylinder space and deliver work to the piston, while the first combustion chamber is closed, and (8) a second exhaust stroke for the second combustion chamber following the second power stroke, wherein exhaust gases are discharged out of said cylinder space. Similar to the previous eight-stroke cycle, each combustion chamber is given a maximum 360 degree crank angle for combustion under a closed-chamber condition, which may provide a sufficiently long time period for the completion of the combustion with a relatively short charge holding time period. A prolonged holding of a compressed charge in a chamber may have a negative effect of reducing engine's performance due to potential charge leakage through the chamber and heat losses to the chamber wall.

Another possible embodiment that may enable closed-chamber combustion for both chambers through timings of the combustion-chamber valves in a six-stroke cycle is also described below. With reference to the engine configuration in FIG. 3 (not necessarily the chamber valves positions in the figure), chamber valve 36 is closed when the piston is near its bottom dead center, and initially all the charge is being compressed into the first combustion chamber. When the piston reaches an intermediate position between the bottom dead center and the top dead center and the pressure and temperature in the first chamber 20 reaches predetermined values, chamber valve 36 is opened and chamber valve 28 is closed and the rest of the charge is compressed into the second chamber 22. When the piston reaches the top dead center, chamber valve 36 is closed and chamber valve 28 reopens to start the first power stroke for the first chamber. In this arrangement, a closed-camber combustion period is provided for the first chamber, which could attain some of the closed-chamber combustion benefits mentioned earlier. This approach, however, may require an exceptionally fast reaction of the chamber valves and the time period provided for the first chamber to attain closed-chamber combustion may be too short.

Figure 8:
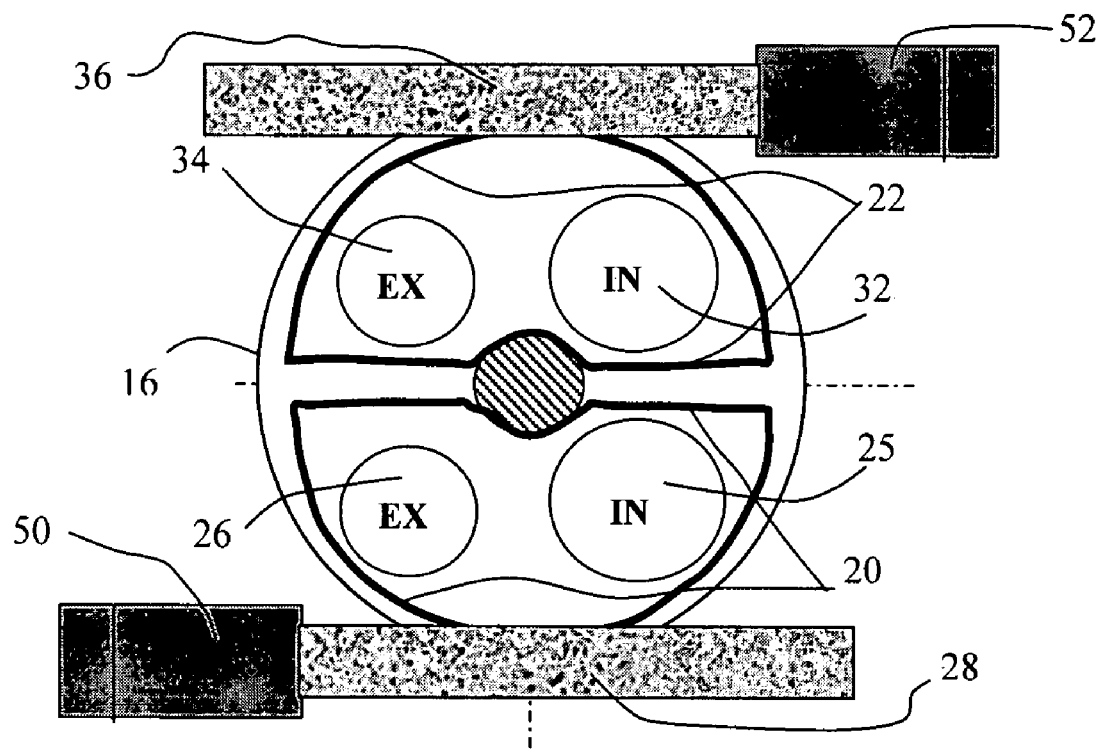
FIG. 8 is a schematic top sectional view of an internal combustion engine unit in accordance with the present invention, illustrating the positions of the slide valve assemblies relative to the combustion chambers and cylinder.

As mentioned earlier, the combustion-chamber valves 28 and 36 may be puppet valves, slide valves, rotary valve, butterfly valve, switch valves, gate valves, ball valves or other types of valves. However, one of the preferred types of valves is a slide valve. If the intake and exhaust valves for both combustion chambers are puppet valves with their valve stems deployed in the cylinder head 12 in a direction substantially parallel to the longitudinal direction of the cylinder, the slide chamber valves 28 and 36 may be deployed in a direction substantially perpendicular to the puppet valve stems at a peripheral location of the cylinder 16, as shown in FIG. 8. The benefits of this deployment are two fold. First, because of its peripheral location, the slide valve may work at a much lower temperature in conjunction with adequate cooling. Second, because of its perpendicular orientation to the intake/exhaust valve stems, the actuators 50 and 52 of the slide valves may have less tendency to compete with the intake/exhaust valve train for space on the top of the cylinder head.

Figure 9:
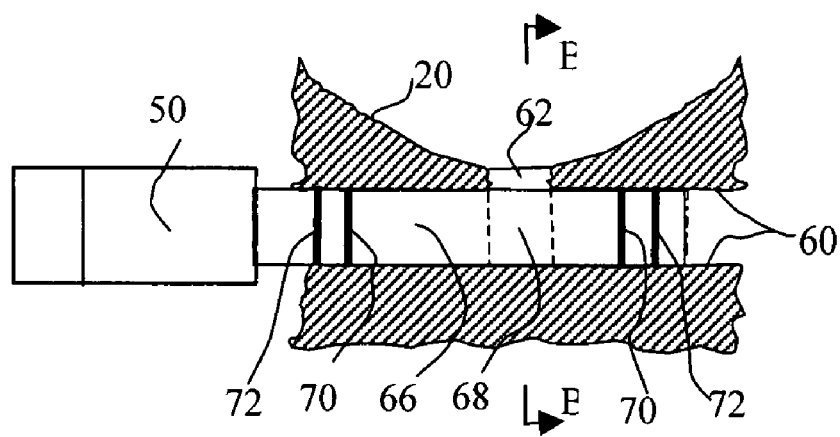
FIG. 9 is a schematic sectional view of a slide valve assembly in accordance with the present invention, illustrating the valve-member passageway registering with the port leading to a combustion chamber.
Figure 10:
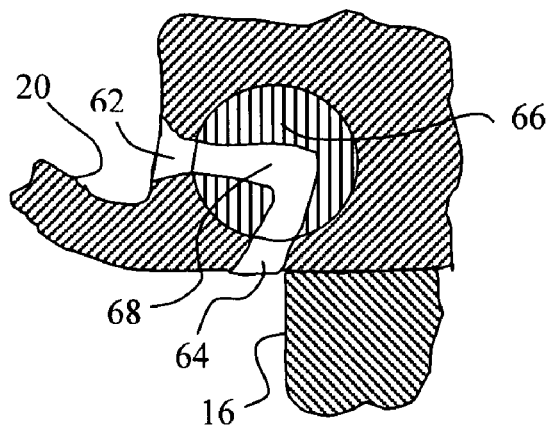
FIG. 10 is a cross-sectional view in the direction B-B of FIG. 9, illustrating the communication between the combustion chamber and cylinder space being established through the valve-member passageway.
Figure 11:
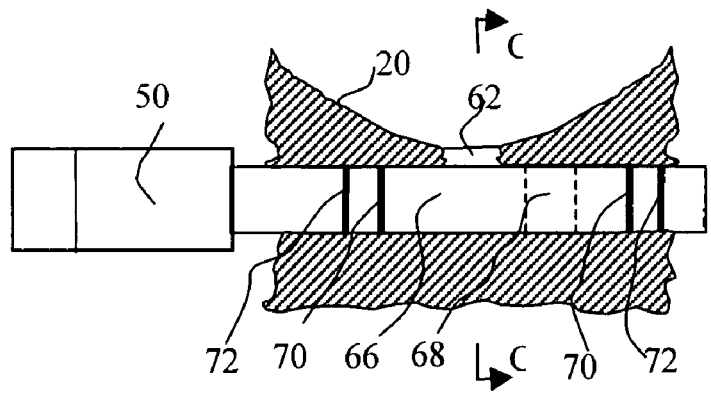
FIG. 11 is a schematic sectional view of a slide valve assembly in accordance with the present invention, illustrating the port leading to a combustion chamber being blocked by the valve member.
Figure 12:
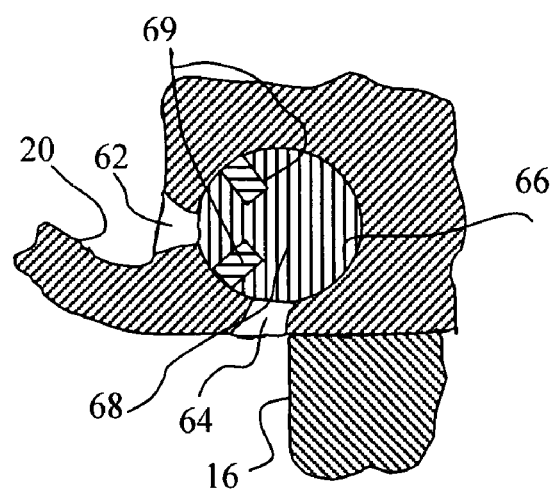
FIG. 12 is a cross-sectional view in the direction C-C of FIG. 11, illustrating the communication between the combustion chamber and cylinder space being blocked by the valve member.

FIG. 9 illustrates schematically a cut-away view of a slide valve assembly 28. The valve assembly comprises a longitudinal valve chamber 60, which has an opening port 62 in communication with combustion chamber 20 and an opening port 64 in communication with cylinder 16 (FIG. 10), a valve member 66 slidably deployed within the chamber 60, and a valve member actuator 50 that may generate a reciprocating motion of the valve member in preferred frequencies. Said valve member has a passageway 68 (FIG. 10) that allows a fluid to flow through the slide valve member in a direction substantially transverse to the longitudinal direction of the valve member. When the passageway 68 registers with ports 62 and 64 as shown in FIGS. 9 and 10, a communication between the combustion chamber 20 and cylinder 16 is established, which may allow a fluid to flow from the combustion chamber into the cylinder space or flow from the cylinder space into the combustion chamber. Under the control of the actuator 50, the passageway 68 may move away from the ports 62 and 64, and the communication between the combustion chamber and cylinder space is thus blocked as shown in FIGS. 11 and 12. Sealing rings 70 and oil control rings 72 may be deployed for the valve member (FIGS. 9 and 11) to reduce the gas leakage to either end of the valve member and to facilitate valve element lubrication. Additionally, a sealing ring pack 69 surrounding the exit of the port 62 or 64 may be disposed, as shown in FIG. 12, to prevent the gas leakage between port 62 and port 64. Oil lubricating or coolant cooling means may be provided for the sealing rings from the ends or through the internal passage of the valve member (not shown).

Valve actuator 50 may be a mechanical driver in connection with a camshaft and a rocker driven by the engine crankshaft, an electromagnetic solenoid driver, a hydraulic system driver, an electro-hydraulic system driver, or a combination of a camshaft driver, an electromagnetic driver, and a hydraulic driver.

One skilled in the art may recognize that the port space 64 such as that shown in FIGS. 10 and 12 may cause some work loss when combustion gas expands from combustion chamber into cylinder 16. However, this work loss can be minimized by designing the top face of the piston 18 in such as way that when the piston 18 reaches the top dead center, the port space similar to 64 is substantially filled by a portion of the top face of piston 18. Additionally, the configuration of the passageway as shown in FIGS. 10 and 12 is schematic in nature, and it may be selected in such a manner that its volume is minimized while providing a sufficiently large flow cross-sectional area between the combustion chamber and cylinder space.

The slide valve assembly described herein may be adapted to a rotary valve assembly that is preferably disposed in a peripheral location of the piston and cylinder assembly (not shown). Similar to the slide valve, the rotary valve may comprise a rotor having a passageway, which, through rotation, may establish the communication between the combustion chamber and cylinder space or block the communication between the combustion chamber and cylinder space, and a valve actuator that may generate a reciprocating rotation of the rotor in preferred frequencies. The actuator may comprise a mechanical driver in connection with a camshaft driven by the engine crankshaft, an electromagnetic solenoid driver, a hydraulic system driver, an electro-hydraulic system driver, or a combination of a camshaft, an electromagnetic solenoid driver, and a hydraulic driver, in conjunction with a motion conversion mechanism to produce a rotating motion In the embodiments so far, each combustion chamber is provided with a combustion chamber valve. However, it is possible that two combustion chambers share a single slide valve assembly or a single rotary valve assembly with a corresponding arrangement of the two combustion chambers (not shown). Additionally, the shape of the valve member may not necessarily be circular; it may take any shape in accordance with a specific engine design.

It is apparent to one skilled in the art that although the descriptions of the slide valve or the rotary valve are related to combustion chamber valves, the slide or rotary valve may be equally used as an exhaust or an intake valve.

To enhance localized cooling and reduce the maximum temperature of a valve member, a heat pipe may be installed in a slide valve along the longitudinal direction of a reciprocating valve member, or installed in a rotary valve along the circumference of a rotating valve member. In this case, a preferred type of heat pipe is the reciprocating heat pipe. Alternatively, an amount of working fluid, such as a liquid metal, may be simply filled within a cavity along the longitudinal direction of a reciprocating valve member in a slide valve or a cavity along the circumference of a rotating valve member in a rotary valve.

Figure 13:
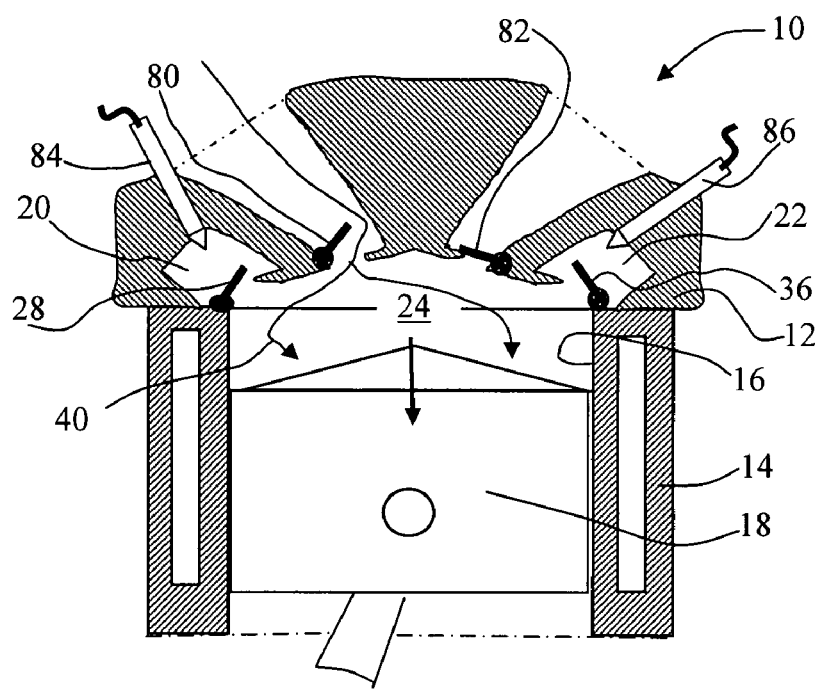
FIG. 13 is a schematic vertical sectional view of an internal combustion engine unit in accordance with the present invention, illustrating the arrangement of the two combustion chambers as well as the positions of the valves and piston, and showing an intake valve and an exhaust valve, respectively for an engine intake port and an engine exhaust port, being shared by the two combustion chambers.

One skilled in the art may also note that the disposition of the intake or exhaust valve is flexible. The dispositions of the intake and exhaust values as shown in FIGS. 2a and 2b are just two of the many options. In FIG. 2a, each combustion chamber would have its own intake and exhaust valves, which may represent an extreme configuration of a combustion-chamber design. In the design shown in FIG. 2b, the two combustion chambers would share exhaust valves while having their own intake valve, which may represent a compromise compared to the design in FIG. 2a. Another arrangement is shown schematically in FIG. 13, in which both intake valve 80 and exhaust valve 82 are shared by combustion chambers 20 and 22 with their own ignition or fuel injection devices 84 and 86, respectively. This configuration may represent another extreme arrangement in a combustion chamber design (In this configuration, the opening of the combustion chambers in the intake stroke may not be mandatory). It is understandable that there may be many possible options between these two extreme configurations for the disposition of the intake/exhaust valves, all of which may be within the spirit of the present invention (One example is that the first combustion chamber is provided with an intake or exhaust valve, but the second combustion chamber having no intake or exhaust valve may share the intake or exhaust valve with the first combustion chamber). Again, all the valves including the intake and exhaust valves illustrated in FIG. 13 are schematic in nature; they may be, but not limited to, puppet valves, slide valves, rotary valve, butterfly valve, switch valves, gate valves, or ball valves. It is also understandable that the configuration and arrangement of the combustion chambers as well as the disposition of the ignition device or fuel injection device are also flexible, not limited to those shown in FIGS. 1-13. In some situations, a combustion chamber may share an ignition or fuel injection device with another combustion chamber. One example related to the description as shown in FIGS. 1-7 is that the ignition of the charge in the second combustion chamber may be facilitated by the exhaust gases near the top dead center due to the early opening of the second combustion chamber valve in the exhaust stroke for the first combustion chamber.

Additionally, one skilled in the art may recognize that the interior volumes of the combustion chambers may not be the same; their relative size may be determined according to a specific engine design. In some operations, it may be necessary to size the two combustion chambers so that the two chambers may receive nearly the same amount of charge at the end of the compression stroke when the piston reaches the top dead center.

It should be noted that the spirit of the present invention to increase the expansion ratio is not limited to the situation of two combustion chambers per cylinder as illustrated above. The same principle is applicable to three or more combustion chambers per cylinder. Suppose that the number of combustion chambers per cylinder is n, where n is an integer, the relation between the expansion ratio and the compression ratio would be $$r_e = n(r_c - 1) + 1$$

The ratio of the expansion ratio to the compression ratio is therefore $$r_e/r_c = n(1 - 1/r_c) + 1/r_c$$

For $r_c=9$, $n=3$, the above two relations give $r_e=25$, and $r_e/r_c=2.78$, which indicates that the expansion ratio is almost tripled. However, the number of strokes per cycle will also need to be increased. In this case, the first two strokes (intake and compression) would be the same for all three combustion chambers. Then each combustion chamber would need two strokes to deliver work and discharge exhaust gas. In the power stroke for a given combustion chamber, all the other combustion chambers must be substantially closed. In the exhaust stroke, however, some of the other chambers may open to aid the exhaust gas release from the cylinder if they have already completed their own power and exhaust strokes. Therefore, the essential number of strokes to complete the cycle for n=3 would be 8. In general for n combustion chambers per cylinder, the engine would operate on a cycle having (2n+2) essential strokes according to the present invention.

One skilled in the art may recognize that while theoretically an engine may be equipped with any number of combustion chambers per cylinder, the number of combustion chambers per cylinder may be limited to 2 or 3 for most of practical applications.

The description of the engine cycles in accordance with the present invention so far are related mainly to increasing expansion ratio or closed-chamber combustion. With equal importance, engine cycles that enable variable compression ratios are disclosed. It is well known that the compression ratio in an engine design is determined primarily based on knock thresholds at the wide-open throttle condition. However, this knock threshold may not be applicable to the part throttle condition when an engine operates under a part-load, which could allow a higher compression ratio to increase the engine's thermal efficiency. Since the majority of an engine's operating time occurs under part load conditions, the incentive to enable a variable compression ratio functionality is significant.

In the following disclosure regarding the variable compression ratio mechanism, the embodiments are based on a two-chamber configuration although the principle may be equally applicable to the configuration having more than two combustion chambers per cylinder. First, when the engine operates under part load conditions, one of the combustion chambers may be closed and deactivated. Consider again the example discussed earlier in which the engine design gives a compression ration of 9 when both combustion chambers are active. If on of the combustion chambers is closed and deactivated, the active combustion chamber would operate on a four-stroke cycle with a compression ratio of 17. As a result, the engine may operate on a much higher compression ratio without encountering the knock condition for a spark-ignition engine or exceeding the pressure limitation for a compression-ignition engine due to a reduced charge intake pressure under a part-throttle condition. To reduce the combustion chamber wall temperature, the two combustion chambers may be alternately activated and deactivated under the control of an electronic control unit. With this arrangement, each combustion chamber is given a fairly long period of "resting" time between active duties and the combustion wall temperature may be substantially reduced. The increased compression ratio discussed herein would represent an upper limit under the condition of a single-active combustion chamber. Under many other working conditions with a variety of power requirements, however, the active combustion chamber may be required to operate at an intermediate compression ratio that is lower than the upper limit and varies constantly under an engine's real-time operating conditions. This requirement may be met through a suitable control algorithm of the electronic control unit. The electronic control unit through an algorithm may constantly process various input information related to, but not limited to, engine power requirement, crank angle, engine speed, throttle position, manifold and ambient pressures, inlet air and coolant temperatures, intake air flow, and knock condition, and alters the output information related to, but not limited to, the ignition timings, valve timings, fuel control, and throttle actuator. In this case, the inactive combustion chamber, although deactivated without combustion, is not closed at all times, and may be in an opening position during a portion of the time period in which the piston moves from the bottom dead center to the top dead center during the compression stroke. This would allow the inactive combustion chamber to admit and enclose a portion of the intake charge and allow the compression ratio of the active combustion chamber to be maintained at an intermediate value below the upper limit set forth when the inactive chamber is closed at all times during the operation of the active chamber. The timings of opening and closing the inactive chamber would be controlled through a control algorithm to maintain a preferred compression ratio for the active combustion chamber. After the active combustion chamber completes the cycle, the active chamber may become an inactive chamber and the inactive chamber may become an active chamber in the next cycle. Alternatively, after the active chamber completes the current cycle, it may continue to be an active chamber in the next cycles until the pressure of the charge accumulated in the inactive chamber exceeds a certain value.

As discussed above, the two combustion chambers may attain different compression ratios and encloses different amounts of charge at the end of the compression stroke through the open and close timings of the chamber valves in the compression stroke. As a broader consideration, the two chambers may burn different fuels with different fuels being injected into different combustion chambers. The compression ratio of an individual combustion chamber may be selected to match the respective combustion and energy conversion characteristics of the fuel. Additionally, the design of an individual combustion chamber may match the combustion requirements of its fuel to attain the best operational benefit.

Figure 14:
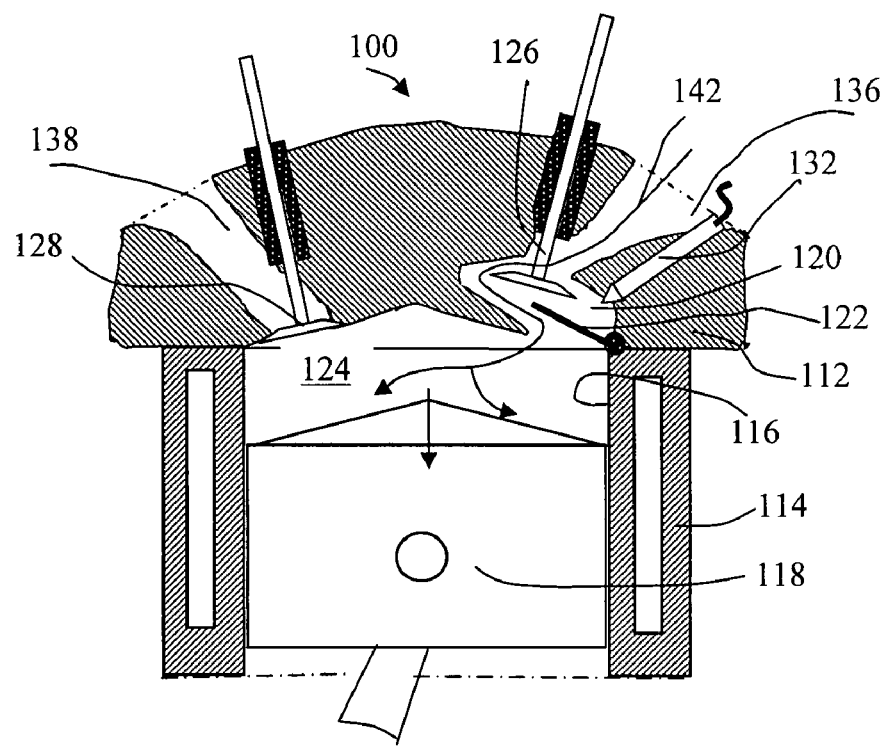
FIG. 14 is a schematic vertical sectional view of an internal combustion engine unit in accordance with the present invention, illustrating the intake stroke of the engine during the engine cold start.

Another important issue related to internal combustion engine technology is the cold start problem especially when an engine operates on an alternative or renewable fuel, such as ethanol, methanol, or bio-diesel fuel. Based on the engine platform as discussed in this invention, a novel approach that may overcome the cold start difficulty is disclosed. FIG. 14 illustrates an internal combustion engine 100 in accordance with the present invention, which includes a cylinder head 112 and an engine block 114. Engine block 114 contains at least a cylinder 116 and a piston 118 that is slidably disposed within the cylinder 116. Associated with the engine cylinder 116, cylinder head 112 defines a holding chamber 120. The holding chamber 120 has a port in communication with the cylinder space 124 and a chamber valve 122 that may open or close the port to establish or block the communication between the holding chamber 120 and the cylinder space 124. The holding chamber 120 may be provided with an intake valve 126 as shown in FIG. 14, or no such an intake valve is deployed within the chamber 120 (not shown). Additionally, an exhaust valve 128 may be disposed within the holding chamber (not shown) or outside of the holding chamber as shown in FIG. 14. The holding chamber may be a combustion chamber or part of a combustion chamber with an ignition device 132 disposed for a homogenous charge engine or a fuel ejector 132 disposed for a compression-ignition engine, or no such an ignition or fuel injection device is disposed inside the chamber 120 (not shown). An ignition or fuel injection device may be disposed outside of the chamber for the charge remaining outside of the chamber when the piston is at the top dead center in the compression stroke (not shown). The chamber may be sized so that when the piston 118 reaches the top dead center, a sufficiently large portion of the charge is compressed into the chamber 120. Together with the intake or exhaust valve, the chamber valve 122 may close the chamber and enclose the charge inside the chamber. In practice, said holding chamber may be a prechamber with a throat valve that may open or close the access of the prechamber to the cylinder space. It is understandable that the prechamber herein may be the prechamber in an indirect injection diesel engine or the divided chamber in a spark-ignition engine.

One skilled in the art may recognize that all the valves including chamber valve 122, intake valve 126 and exhaust valve 128 are schematic in nature; they may be puppet valve, slide valve, rotary valve, butterfly valve, switch valve, gate valve, ball valve, or other type of valve. The disposition of an intake or exhaust valve is also flexible; it may be deployed in the holding chamber or outside of the chamber. Additional intake or exhaust valves may be deployed outside of the holding chambers, which are not shown.

Figure 15:
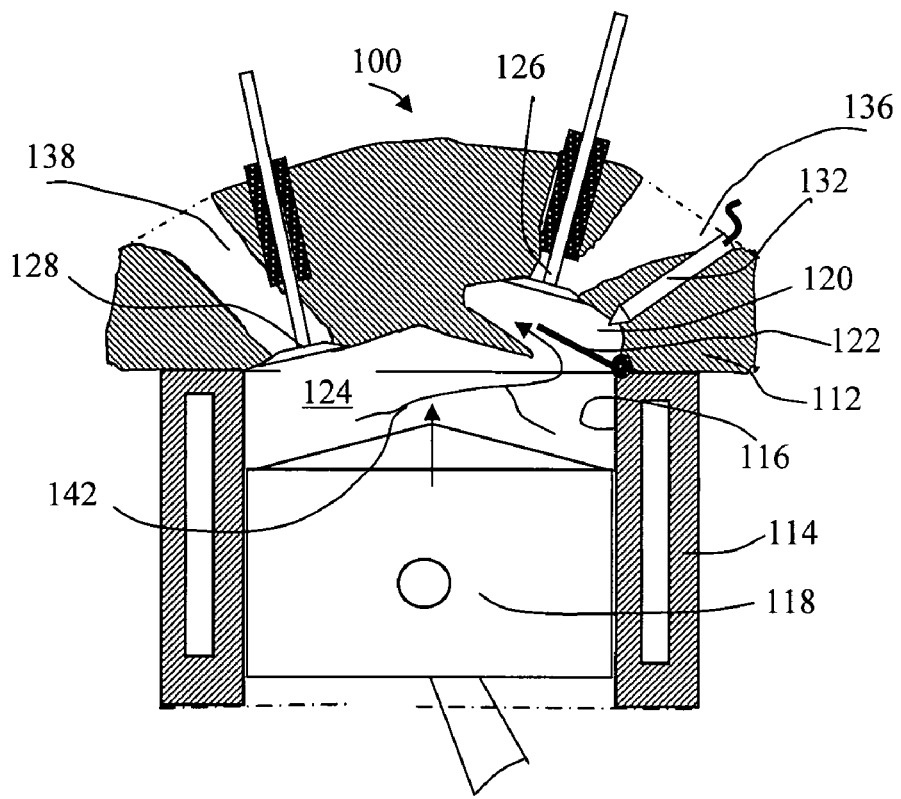
FIG. 15 is a schematic vertical sectional view of an internal combustion engine unit in accordance with the present invention, illustrating the compression stroke of the engine during the engine cold start.
Figure 16:
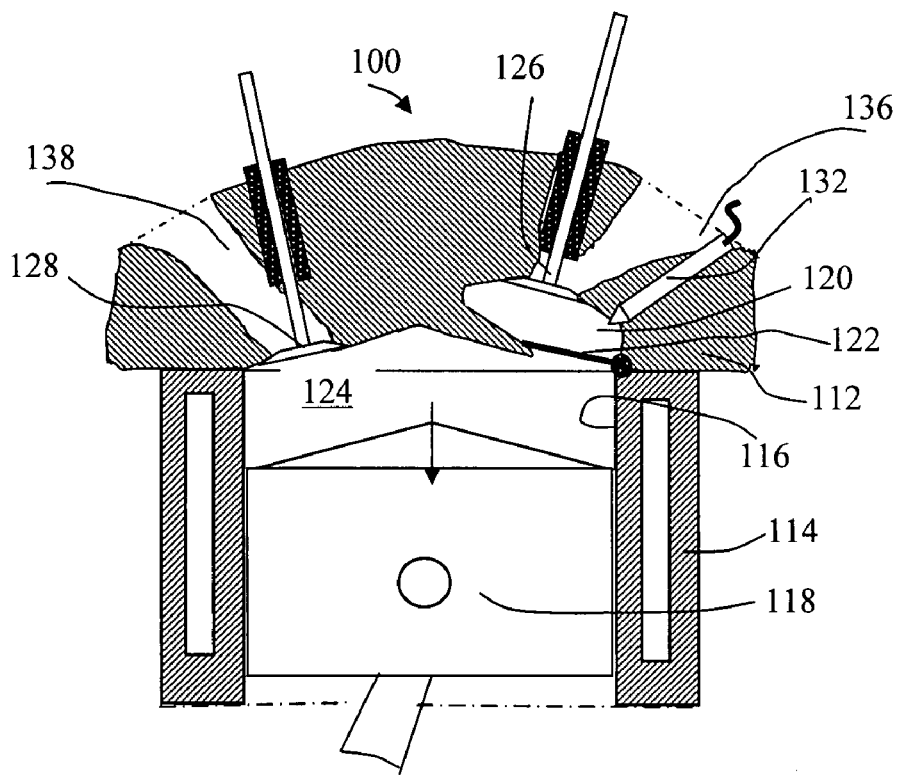
FIG. 16 is a schematic vertical sectional view of an internal combustion engine unit in accordance with the present invention, illustrating the downward movement of the piston from the top dead center to the bottom dead center while an amount of charge is being enclosed within a combustion chamber or a holding chamber during the engine cold start.
Figure 17:
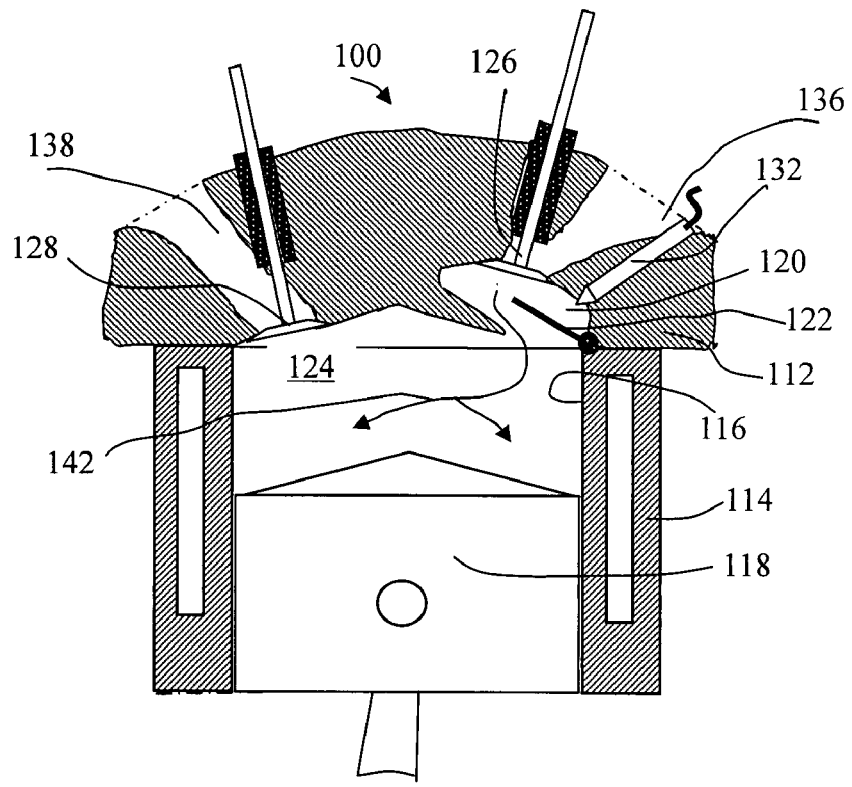
FIG. 17 is a schematic vertical sectional view of an internal combustion engine unit in accordance with the present invention, illustrating the expansion of the charge from the combustion chamber or holding chamber into the cylinder space against a low pressure environment while the piston is near the bottom dead center during the engine cold start.

It is well known that two key factors that would determine the success of a cold start are the ignition temperature and ignition delay. The ignition temperature is the minimum temperature to which a substance must be heated before it will spontaneously burn independent of the source of heat. In generally, alternative fuels such as ethanol and methanol have a much higher ignition temperature. For instance, the ignition temperatures of ethanol and methanol are about 425° C. and 463° C., respectively, compared to the ignition temperature range of 200-300° C. for diesel fuels and gasoline. For a successful auto-ignition, the charge temperature at the end of the compression stroke must exceed the ignition temperature of the fuel. During the cold start, charge 142 with a relatively low temperature is admitted into the cylinder space (FIG. 14), either through valve 126 or intake valves outside of the holding chamber. After the completion of the intake stroke, an amount of charge is compressed into the holding chamber 120 as shown in FIG. 15. When the piston is near the top dead center, the chamber valve 122 is closed, enclosing the charge within the holding chamber. If the ignition of fuel in the holding chamber is successful, the chamber valve 122 may open in the following power stroke and release combustion gases into the cylinder space, and the engine may be operated on a conventional four-stroke cycle (not shown). However, although the compression may have increased the energy content or internal energy of the charge (part of the compression work may be used for the vaporization of the fuel for a homogeneous charge engine), the temperature rise of the charge in the combustion chamber at the end of the compression stroke may not be sufficiently large for a successful ignition (either by an ignition device or auto ignition), due to the cold start condition. In this case, the chamber valve as well as the intake and exhaust valves would remain closed as the piston travels downwardly from the top dead center to the bottom dead center as shown in FIG. 16. One of the most important conditions that need to be noticed in this process is that the chamber valve 122 may remain mostly closed in this downward stroke, which prevents the charge enclosed in the chamber from expanding into the cylinder against the piston. Once the piston has moved sufficiently away from the top dead center or in the vicinity of the bottom dead center, the chamber valve 122 then opens and releases the charge in the chamber into the cylinder space, as shown in FIG. 17. The significance of this event is briefly explained in Thermodynamics terms. Applying the first law of Thermodynamics to the charge previously being enclosed in the chamber 120 over the expansion process, as shown in FIG. 17, when the piston is substantially near the bottom dead center, one would have $$\Delta U = U_2 - U_1 = -\Delta Q - p_{eff} \Delta V$$

where $U_1$ is the internal energy of the charge when it is enclosed inside the chamber before the expansion, and $U_2$ is the internal energy of the charge after the expansion in the cylinder is complete, $\Delta Q$ is the heat transfer from the charge to the piston, cylinder wall, or the bottom face of the cylinder head, and $p_{eff} \Delta V$ is expansion work done by the charge against the surroundings during the expansion, which is directly related to the average or effective pressure surrounding the expanding charge. Consider ideal or extreme conditions, in which the heat transfer to the surrounding is ignored, and the charge is completely compressed into the chamber in the compression stroke (an extreme condition), which would result in a near vacuum condition in the cylinder space when the piston reaches the bottom dead center before the expansion of the charge. Consequently, when the chamber valve 122 opens, the charge would expand against a low pressure or near vacuum surrounding with a small or near zero effective pressure, and the above equation for $\Delta U$ would reduce to $$\Delta U = U_2 - U_1 = 0, \text{ or } U_2 = U_1$$

Figure 18:
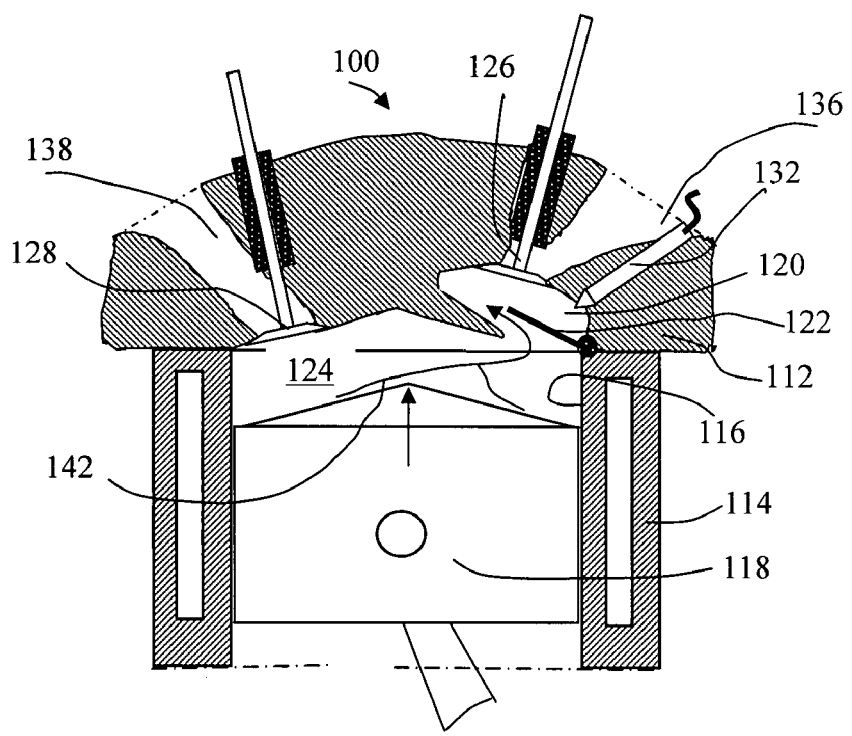
FIG. 18 is a schematic vertical sectional view of an internal combustion engine unit in accordance with the present invention, illustrating the charge being compressed back into a combustion chamber or holding chamber to a state having a higher energy content.

The above relation, although under ideal or extreme conditions that may never occur in a real operation, indicates that the energy content or temperature rise of the charge from the first compression may be substantially conserved during the expansion process. The charge is then compressed back into the chamber for another increase in the energy content, as shown in FIG. 18. The process described herein may be repeated until the charge temperature rises to a sufficiently high level in the combustion chamber and the ignition is successful.

It should be pointed that in addition to the charge release when the piston is in the vicinity of the bottom dead center as shown in FIG. 17, the energy content of the charge may also be conserved if the charge is released from the chamber into the cylinder space during the compression stroke through the late opening of the chamber valve. In this case, the energy addition to the charge in the compression stroke may be reduced due to the late release of the charge into the cylinder.

One skilled in the art may recognize that this repeated process may be subject to the limitation of maximum charge pressure near the end of a compression stroke due to the incremental charge pressure rise after each compression. This maximum pressure limitation may be alleviated under a part throttle condition, by adjusting the amount of the charge enclosed within the chamber at the end of a compression stroke through the adjustment of the timings of the chamber valve, or by late release of the charge from the chamber into the cylinder space in the compression stroke.

The significance of the present invention may be more understandable by considering a conventional engine without the present invention. Since the charge after the first compression is not being enclosed in the combustion chamber for the conventional engine, the compressed charge would expands against the piston as the piston travels from the top dead center to the bottom dead center. During this process, the charge would return most, if not all, of the energy content acquired in the compression process back to the piston. As a result, the energy content level of the charge when the piston is at the bottom dead center would be almost the same as that of the fresh charge before the first compression. A further compression would do little to further increase the energy content level compared to the energy level at the end of the first compression.

It is understandable that the valves as shown in FIGS. 14-18 may be a preferred type of valve, especially for chamber valve 122, such as a slide valve or a rotary valve, similar to those discussed earlier. In this cold start application, however, the working condition of a slide valve or rotary valve as a chamber valve is much less stringent. First, the chamber valve may work only during the engine startup period, which is a very small fraction of the entire engine's operational life. Second, at the cold startup, the engine temperature is always low. Therefore, there may not have any thermal related problem for valve member lubrication. Additionally, once the startup is complete, the chamber valve 122 may remain in an open position without motion during the normal operation. On the other hand, if the holding chamber is not working as a combustion chamber or part of a combustion chamber, the holding chamber may be closed after the engine has successfully started, and remains to be so during the rest of the engine operation. The key for the design of the valve assembly is to provide a large opening between the chamber and the cylinder space when other design conditions are met.

In addition to the cold start mechanism through the energy conservation when the charge is released into the cylinder space as described above, another method for cold start is to increase the compression ratio based on the engine configuration as shown in FIG. 14 as well as the descriptions associated with the figure in this disclosure. If the holding chamber is to remain open under full load operations, the holding chamber may be closed before the start of a compression stroke in the cold start (Or the holding chamber is closed in the intake stroke with an intake valve deployed outside of the holding chamber). In this case, the compression ratio would be a maximum compared to the case when the chamber valve remains wide open in the compression stroke. This increased compression ratio may have the benefit of providing a better chance for a successful cold start. According to the cold start condition, the engine may operate at a variable compression ratio between the above mentioned maximum compression ratio and the minimum compression ratio when the holding chamber is open throughout the compression stroke. With an initial opening position of the chamber valve, a variable compression ratio may be attained by adjusting the timing of closing the chamber valve between the bottom dead center and the top dead center in the compression stroke. Also in this case, an ignition or fuel injection device may be needed outside of the holding chamber (not shown in FIG. 14).

As mentioned earlier, the second important factor that would determine the success of a cold start is the ignition delay. It is well known that the ignition delay is a strong function of cetane number of a fuel. Cold start problems with alternative fuels may arise because of the long ignition delay due to their low cetane number, and the engine platform presented in this disclosure could potentially solve this cold start problem. In this case, the holding chamber 120 in FIG. 14 may be a prechamber or a more general combustion chamber. During the cold-start process, the engine based on the present platform may be operated on a cycle that enables combustion under closed-chamber conditions, so that the cycle could provide a sufficiently large crank angle (or long time) for the ignition of the fuel. This cycle may be a six-essential-stroke cycle. The six-essential strokes may include an intake stoke similar to the one shown in FIG. 14, in which an amount of charge is admitted into the cylinder and a compression stroke similar to the one in FIG. 15, in which an amount of charge is compressed to a higher temperature/pressure within the prechamber. When the piston is in the vicinity of the top dead center, the prechamber is closed and encloses the charge entering the prechamber in the compression stroke. This compression stroke is then followed by two additional strokes, in which the piston moves from the top dead center to the bottom dead center and returns from the bottom dead center to the top dead center, while the prechamber remains closed and fuel is injected into the prechamber for a compression-ignition engine or charge is being ignited through an ignition device for a homogenous charge engine. These two additional strokes are then followed by a power stroke, in which the chamber valve is opened and combustion gases from the prechamber expand into the rest of the combustion chamber or ignite the charge outside of the prechamber, and then expand into the cylinder space to deliver work to the piston. This power cycle as usual is then followed by an exhaust stroke to complete cycle. In this six-essential-stroke cycle, the charge is given a maximum of 360 degree crank angle for ignition under a closed-chamber condition, which should be sufficiently long to overcome the problem associated with ignition delay. Additionally, since the ignition delay would be a strong function of charge temperature. The technique described here to overcome the ignition delay may be combined with the mechanism for raising the charge temperature described earlier to provide a complete procedure for a successful cold start of an engine using fuels with a high concentration of alternative fuels.

One skilled in the art may recognize that the number of strokes inserted between the compression and power strokes may be greater than two to further increase the crank angle for ignition. Or the number of the strokes inserted between the compression and power strokes is zero and the engine may still operate on a four-stroke cycle; but the release of the charge from the prechamber into the cylinder space is delayed in the power stroke to increase the crank angle for ignition.

The afore-described six-essential-stroke cycle, which enables closed-chamber combustion, may also be employed during the warm-up process after a successful cold start. It is known that the hydrocarbon emission during the cold-start/warm-up process would constitute more than three quarters of the hydrocarbon emission during a typical driving cycle, due to cold engine walls and pistons, which causes incomplete fuel combustion. In this six-essential-stroke cycle, the charge is given a maximum of 360 degree crank angle or more to complete the combustion under a closed-chamber condition. The closed-chamber combustion would also avoid quenching flame by cold pistons and engine walls, maintain a higher combustion chamber wall temperature, and consequently achieve a more complete combustion. This feature is particularly important to a fuel having a large latent heat or a slow vaporization rate, such as ethanol or methanol, to avoid excessive pollutant emissions. It is necessary to point out that although the description of the mechanisms introduced so far is based on cold-start/warm-up, these mechanisms are equally applicable to warm start, idle, or normal working conditions for environment related benefits.

The closed-chamber combustion as enabled by the six-stroke cycle described herein may have the benefits of overcoming other difficulties associated with an internal combustion engine operating on alternative fuels such as ethanol and methanol. It is known that high alcohol concentrations may inhibit upper engine lubrication and corrode engine components such as cylinder wall and crank bearings, which may lead to premature engine failure. In some situations, it may require a lubricant different from that used in a gasoline or diesel engine. For an internal combustion engine having the feature of closed-chamber combustion, particularly for a compression ignition engine with air as the intake charge, the fuel is directly injected into the closed combustion chamber and combustion is substantially complete (almost no alcohol left) before the gases resulting from the combustion are released into the cylinder. As a result, the problems associated with the lubrication and corrosion due to a high concentration of an alcohol are substantially eliminated. Additionally, because of the ample charge holding time, the fuel inject rate into the combustion chamber may be adjusted to avoid so-called "diesel knock" for a fuel having a low cetane number.

Due to the motivation of closed-chamber combustion as well as some others that will be described later, the engine may operate on a six-essential-stroke cycle during normal operations after the cold-start and warm-up processes are complete. In this case, the two additional strokes after the compression stroke, as described earlier in the six-stroke cycle, may also be employed as the power and exhaust strokes, respectively, for the charge outside of the prechamber or holding chamber with the installation of an ignition device or a fuel injector outside of the prechamber or holding chamber (not shown in FIG. 14). In this case a two combustion chamber phenomenon may be considered, one with a chamber valve (such as the prechamber or holding chamber in this disclosure) and the other without a chamber valve (the rest of the clearance volume outside of the prechamber or holding chamber). The combustion of the charge outside of the prechamber or holding chamber would occur at the end of the compression stroke when the piston is near the top dead center. The power stroke of the charge outside of the prechamber or holding chamber would then follow when the prechamber or holding chamber (which is one of the two combustion chambers when the two combustion chamber phenomenon is considered) is closed. Because of the closing of the prechamber or holding chamber, the expansion ratio of the combustion gases outside of the prechamber or holding chamber would be substantially increased compared to the compression ratio. Like an over expanded engine, this increased expansion ratio will increase the thermal efficiency of the engine. In general, with the engine platform as shown in FIG. 14, the increase in thermal efficiency is amounted to about 10%.

The six-essential-stroke cycle described herein may be especially permissible when an engine operates on a part load. Additionally, the strokes inserted between the compression stroke and the power stroke may be greater than two if the engine load requirement is substantially low. Or non-essential strokes may be added before the intake stroke or after the exhaust stroke of the afore-described six-essential-stroke cycle. On the other hand, when the high power output is the top priority for the performance, the combustion chamber valve may remain wide open and the engine would operate on conventional four stroke cycles.

The cold start strategy described herein in accordance with the present invention may be readily applied to the engine platform having two or more combustion chambers per cylinder, as shown in FIG. 1. To increase the charge temperature at the end of the compression stroke, the startup is proceeded one combustion chamber at a time with the other chambers being inactive. As explained earlier, the active combustion chamber may operate on a compression ratio that may be varied and increased according to the cold-start condition. For the configuration of two combustion chambers per cylinder, the compression ratio of the active combustion chamber may be almost doubled when the other combustion chamber is completely closed in the cycle, which would represent an upper limit of the compression ratio and is beneficial for the cold startup. If the energy level or temperature of the charge at the end of the compression stroke is not sufficiently high for fuel ignition, the chamber valve for the active chamber will be closed at the end of compression stroke, which would enclose an amount of charge in the active chamber. If the ignition of the fuel in the active combustion chamber is successful, the chamber valve may open some time in the following power stroke and release combustion gases into the cylinder space, and the active combustion chamber may operate on a conventional four-stroke cycle (not shown). However, if the fuel ignition is still not successful, the charge may remain enclosed within the active combustion chamber while the piston moves downwardly from the top dead center to the bottom dead center. When the piston is sufficiently away from the top dead center, when the piston is in the vicinity of the bottom dead center, or when the piston moves from the bottom dead center to the top dead center in the compression stroke, the chamber valve would open to allow the charge to be released into the cylinder against a low pressure environment to conserve the energy content of the charge or to receive additional energy input from the piston. The charge is then compressed back into the chamber to a higher energy level. This process may continue until the charge's energy content or temperature reaches a sufficiently high level to allow for a successful fuel ignition. As mentioned earlier, since the charge pressure may be substantially increased due to the incremental charge pressure rise after each compression stroke under current engine start procedure, the charge pressure near the end of a compression stroke may exceed a predetermined maximum value under structural considerations. This maximum pressure limitation may be alleviated under part throttle conditions, or by allowing another combustion chamber that has not started yet to take in some of the charge to reduce the pressure of the charge in the cylinder space.

Similar to the discussion of ignition delay in connection with the engine configuration as shown in FIG. 14, the ignition delay problem associated with the engine platform having two or more combustion chambers per cylinder may be solved through the increase in crank angle for ignition. For an engine configuration having two combustion chambers per cylinder such as that shown in FIG. 1, the six essential stroke cycle or the eight essential stroke cycle in connection with the engine configuration in FIG. 1 may be employed during the cold start. In these cycles, at least one combustion chamber is given a maximum of 360° or larger crank angle for ignition under a closed-chamber condition, which should provide a sufficiently long ignition time to overcome the problem associated with ignition delay. For an even larger crank angle for ignition, non-essential strokes may be inserted before, in-between, or after the six essential stroke cycle or the eight essential stroke cycle. Also other benefits related to engine warm up, idle, and component corrosion discussed earlier in connection with the engine configuration in FIG. 14 will also be applicable to the engine configuration having two or more combustion chambers per cylinder such as that shown in FIG. 1.

In addition to the unique operational advantages associated with each individual cycle, the engine introduced in this disclosure may have a distinct advantage of providing flexible operating modes on the basis of a portfolio of thermodynamic cycles. For example, for the engine configuration having two combustion chambers per cylinder, based on the same engine platform and controlled by an engine electronic control unit, the engine may operate on the cycles for cold start, the eight stroke cycle with two intake and two compression strokes when a vehicle accelerates in a local street, which is especially important for a diesel engine powered vehicle to avoid excessive smoke emission. When the vehicle is being driven in the same local street with a relatively low and constant speed, the engine may switch to the eight essential stroke cycle with a single intake and compression stroke to reduce fuel consumption and at the same time to avoid smoke emission. During the majority of the driving time on a high way or a road in a rural area, the engine may operate on the six essential stroke cycle to provide sufficiently high power output and at the same time to save energy. Additionally, during the quick acceleration or under a light load condition, the engine may switch, respectively, to the conventional four-stroke cycle or the variable compression ratio cycle introduced in this disclosure.

It should be noted that although the embodiments of the present invention are based largely on an Otto-type spark-ignition internal combustion engine or a diesel-type compression-ignition engine, the spirit of the invention may also be applicable to other types of engines, such as gas-burning engines including natural-gas burning engines and hydrogen-burning engines, two-stroke type internal combustion engines, engines with alternative structures or fuel ignition means, such as paired piston engines, reciprocating piston engines without a crankshaft, engines with highly compressed gas ignition means, and homogenous charge compression ignition (HCCI) engines in which the fuel ignition or fuel injection device as shown in FIGS. 1, 3-7, and 13-18 may not be necessary. Additionally, an internal combustion engine according to the present invention may be employed in a hybrid electric vehicle, which incorporates an internal combustion engine with an electric motor and storage batteries. With a hybrid electric vehicle platform, any reduction in the mean effective pressure during the vehicle acceleration may be more than compensated by the electric power from the combination of the motor and batteries.

It will thus be seen that the invention effectively attains the objectives set forth above. It is intended that all matter contained in the above specification or shown in the accompanying drawings be interpreted as illustrative and not in a limiting sense. The descriptions regarding the positions or conditions of various engine components, such as valves, piston, cylinder, or combustion chambers, are representative in nature for illustrating operating principles of an internal combustion engine according to the present invention. For example, when it is stated that a combustion chamber is closed or open in a stroke, it does not exclude the occurrence of an early opening or an early closing of the combustion chamber in the stroke. Another example is that when it is stated that an exhaust valve shared by two combustion chambers is open during the exhaust stroke for the first combustion chamber, it does not exclude the condition of an early closing of the exhaust valve to accommodate an early opening of the second combustion chamber for the following power stroke of the second combustion chamber. Any variation of the subject invention will be apparent to those skilled in the art after considering this specification together with the accompanying drawings.

What is claimed is:

1. An internal combustion engine comprising:
at least a piston and cylinder assembly including a piston reciprocatingly mounted within a cylinder space;
at least two combustion chambers associated with each said piston and cylinder assembly, each said combustion chamber having a port leading to said cylinder space and a chamber valve,
said chamber valve opening or closing said port to establish or block the communication between said combustion chamber and said cylinder space,
wherein said internal combustion engine is adapted to operate on preferred cycles in accordance with operating conditions to a) attain a greater expansion ratio than the compression ratio wherein a charge is compressed into the at least two combustion chambers during a compression stroke, or b) provide a variable compression ratio mechanism.

2. The engine as described in claim 1, wherein said internal combustion engine is adapted to operate on a cycle including 2n+2 essential strokes, where n is the number of combustion chambers associated with each piston and cylinder assembly, said 2n+2 essential strokes including:
(a) an intake stroke, wherein an amount of said charge is admitted into said cylinder space,
(b) the compression stroke for said combustion chambers, wherein said charge is compressed to an elevated pressure within the combustion chambers, and
(c) the remaining 2n essential strokes in the cycle being divided and evenly assigned to each combustion chamber, each said combustion chamber having a power stroke and an exhaust stroke, wherein high temperature, high pressure gases from said combustion chamber expand in the cylinder space and deliver work to the piston in the power stroke, and wherein exhaust gases are discharged out of said cylinder space in the exhaust stroke following the power stroke, thereby an expansion ratio greater than the compression ratio is attained.

3. The engine as described in claim 1, wherein the number of combustion chambers associated with each piston and cylinder assembly is two and the engine operates on a cycle including six essential strokes, said six essential strokes including:
a) an intake stroke, wherein an amount of said charge is admitted into said cylinder space,
b) the compression stroke for both combustion chambers, wherein said charge is compressed to an elevated pressure within both first and second combustion chambers,
c) a power stroke for the first combustion chamber, wherein the combustion chamber valve for the first combustion chamber remains open and high pressure, high temperature gases from the first combustion chamber expand in the cylinder space and deliver work to the piston, while the second combustion chamber is closed and encloses the charge entering the second combustion chamber in said compression stroke,
d) an exhaust stroke for the first combustion chamber, wherein exhaust gases are discharged out of said cylinder space, while the second combustion chamber is closed,
e) a power stroke for the second combustion chamber, wherein combustion gases from the second combustion chamber expand in said cylinder space and deliver work to the piston, while the first combustion chamber is closed, and
f) an exhaust stroke for the second combustion chamber, wherein exhaust gases are discharged out of said cylinder space, thereby an expansion ratio greater than the compression ratio is attained.

4. The engine as described in claim 3, wherein the combustion chamber valve associated with the second combustion chamber closes early in the compression stroke before the piston reaches the top dead center, thereby the difference between the peak pressures in the two combustion chambers is substantially reduced in the cycle.

5. The engine as described in claim 1, wherein said internal combustion engine is adapted to operate on a cycle including 2n+4 essential strokes, wherein n is the number of combustion chambers associated with each piston and cylinder assembly, said 2n+4 essential strokes including:
(a) an intake stroke, wherein an amount of said charge is admitted into said cylinder space,
(b) the compression stroke for said combustion chambers, wherein said charge is compressed to an elevated pressure within the combustion chambers,
(c) two additional strokes, wherein piston moves from a top dead center to a bottom dead center and from the bottom dead center to the top dead center, while the compressed charge entering the combustion chambers in the compression stroke is enclosed within the chambers, and
(d) the remaining 2n essential strokes in the cycle being divided and evenly assigned to each combustion chamber, each said combustion chamber having a power stroke, wherein high pressure, high temperature gases from said combustion chamber expand in the cylinder space and deliver work to the piston while the other combustion chambers are closed, and an exhaust stroke following said power stroke, wherein exhaust gases are discharged out of said cylinder space while the other combustion chambers that have not completed their power stroke in the cycle are closed, thereby an expansion ratio greater than the compression ratio and closed-chamber combustion are attained.

6. An internal combustion engine comprising:
at least a piston and cylinder assembly including a piston reciprocatingly mounted within the cylinder space, and two combustion chambers associated with each said piston and cylinder assembly, each said combustion chamber having a port leading to said cylinder space and a valve, said valve opening or closing said port to establish or block the communication between said combustion chamber and cylinder space, wherein the engine is adapted to operate on a cycle including eight essential strokes, said eight essential strokes including:
(a) a first intake stroke, wherein an amount of charge is admitted into said cylinder space,
(b) a first compression stroke for the first combustion chamber following the first intake stroke, wherein charge is compressed to an elevated pressure within the first combustion chamber, (c) a second intake stroke for the second combustion chamber following the compression stroke for the first combustion chamber, wherein an amount of charge is admitted into said cylinder space, while the first combustion chamber is closed and encloses the charge entering the first combustion chamber in the first compression stroke, (d) a second compression stroke for the second combustion chambers following the second intake stroke, wherein said charge is compressed to an elevated pressure within the second combustion chamber, while the first combustion chamber is closed, (e) a first power stroke for the first combustion chamber following the second compression stroke, wherein high pressure, high temperature gases from the first combustion chamber expand in the cylinder space and deliver work to the piston, while the second combustion chamber is closed and encloses the charge entering the second combustion chamber in the second compression stroke, (f) a first exhaust stroke for the first combustion chamber following the first power stroke, wherein exhaust gases are discharged out of said cylinder space, while the second combustion chamber is closed, (g) a second power stroke for the second combustion chamber following the first exhaust stroke, wherein high pressure, high temperature gases from the second combustion chamber expand in the cylinder space and deliver work to the piston, while the first combustion chamber is closed, and (h) a second exhaust stroke for the second combustion chamber following the second power stroke, wherein exhaust gases are discharged out of said cylinder space, thereby, closed-chamber combustion is attained in both first and second combustion chambers.

7. The engine as described in claim 1, wherein during a cycle at least one of the combustion chambers is closed and deactivated, and a combustion chamber remaining active operates on a higher compression ratio.

8. The engine as described in claim 1, wherein during a cycle at least one of the combustion chambers is deactivated without ignition or fuel injection, and wherein a deactivated combustion chamber is open but closes earlier in the compression stroke of the cycle to vary the compression ratio of an active combustion chamber.

9. The engine as described in claim 1, wherein different combustion chambers operate on different compression ratios and burn different fuels.

10. The engine as described in claim 1, wherein the combustion-chamber valve associated with a combustion chamber closes earlier before the piston reaches the top dead center in the exhaust stroke associated with said combustion chamber, and a combustion-chamber valve associated with another combustion chamber, whose power stroke will commence immediately following said exhaust stroke, opens earlier before the piston reaches the top dead center.

11. The engine as described in claim 1, wherein the timing of ignition for a homogenous charge engine or the timing of fuel injection for a compression-ignition engine is selected in such a manner that the maximum pressure in a given combustion chamber will not exceed a predetermined value.

12. The engine as described in claim 1, wherein the timing of ignition for a homogenous charge engine or the timing of fuel injection for a compression-ignition engine is selected in such a manner that the combustion in a combustion chamber is substantially complete before the start of the power stroke for said combustion chamber.

13. The engine as described in claim 1, wherein, the cylinder space as defined by the bottom face of the cylinder head, the top face of the piston, and the side wall of the cylinder is minimized when the piston reaches the top dead center.

14. The engine as described in claim 1, wherein during the cold start of the engine, only one of the combustion chambers is active at a time, and the active combustion chamber operates on a compression ratio that is varied and increased according to the cold start condition.

15. The engine as described in claim 1, wherein during the start up of the engine, the combustion chamber valve associated with an active combustion chamber is closed and an amount of compressed charge is enclosed within said active combustion chamber when a compression stroke is complete, said active combustion chamber is opened and releases combustion gases into the cylinder space in the following power stroke if the fuel ignition is successful, and the active combustion chamber may operate on a conventional four-stroke cycle, if the fuel ignition is not successful, said charge remains being enclosed as the piston moves from top dead center to bottom dead center, and is released from the active combustion chamber into the cylinder space when the piston is sufficiently away from the top dead center, when the piston is in the vicinity of the bottom dead center, or when the piston moves from the bottom dead center to the top dead center, said charge is then compressed into the combustion chamber with a higher energy content, said expansion and compression may be repeated until the temperature of the charge reaches a sufficiently high level for a successful combustion initiation.

16. An internal combustion engine comprising:
at least a piston and cylinder assembly including a piston reciprocatingly mounted within a cylinder space, and at least a holding chamber associated with each said piston and cylinder assembly, each said holding chamber having a port leading to said cylinder space and a chamber valve, said chamber valve opening or closing said port to establish or block the communication between said holding chamber and said cylinder space, said holding chamber is a prechamber, a divided chamber, a general combustion chamber, or part of a combustion chamber, wherein during engine cold start up the holding chamber opens after the piston initiates downward movement, in a stroke prior to a recompression stroke.

17. The engine as described in claim 16, wherein during the start up of the engine, the holding chamber is closed and a sufficiently large portion of compressed charge is enclosed within said holding chamber after a compression stroke is complete, said holding chamber is opened and releases combustion gases into the cylinder space in the following power stroke if the fuel ignition is successful, and the engine may operate on a conventional four-stroke cycle, if the fuel ignition is not successful, said charge remains being enclosed as the piston moves from a top dead center to a bottom dead center and is released from the holding chamber into the cylinder space when the piston is sufficiently away from the top dead center, when the piston is in the vicinity of the bottom dead center, or when the piston moves from the bottom dead center to the top dead center, said charge then being compressed to a higher energy content level in a following compression stroke, said expansion and compression process may be repeated until the charge reaches a sufficiently high temperature for a successful combustion initiation.

18. The engine as described in claim 16, wherein said engine is adapted to operate on preferred cycles to provide a larger crank angle for fuel ignition during start up, or to provide closed-chamber combustion under normal, warm-up, start up, or idle conditions, said cycle may be a six essential stroke cycle including:

(a) an intake stroke, wherein an amount of charge is admitted into said cylinder space, (b) a compression stroke, wherein charge is compressed to an elevated pressure within the combustion chamber, (c) two additional strokes, wherein the piston moves from the top dead center to the bottom dead center and from the bottom dead center to the top dead center while a sufficiently large portion of the compressed charge is enclosed within the combustion chamber and fuel is injected into said combustion chamber, or the charge is being ignited within the enclosed combustion chamber, (d) a power stroke, wherein gases resulting from combustion expand in the cylinder space and deliver work to the piston, (e) an exhaust stroke, wherein exhaust gases are discharged out of said cylinder space.

19. The engine as described in claim 18, wherein said two additional strokes are, respectively, the power stroke and exhaust stroke for the charge remaining outside of the enclosed combustion chamber.

20. The engine as described in claim 16, wherein during the cold start of the engine, a compression ratio is varied and increased through the timing of closing said chamber valve in a intake stroke or in a compression stroke.

21. The engine as described in claims 1, 6, or 16, wherein said combustion chamber valve or holding chamber valve is a slide valve assembly, said slide valve assembly being preferably disposed in a peripheral location of the piston and cylinder assembly and comprising a chamber having a port in communication with the combustion or holding chamber and a port in communication with the cylinder space, a slide valve member slidably disposed within said valve chamber, said valve member having a passageway allowing a fluid to flow through said valve member, and a valve actuator being capable of producing a reciprocating motion of said valve member, said valve actuator being a mechanical driver in connection with a camshaft and a rocker driven by an engine crankshaft, an electromagnetic solenoid driver, a hydraulic system driver, an electro-hydraulic system driver, or a combination of a camshaft driver, an electromagnetic driver, and a hydraulic driver, wherein the communication between said combustion or holding chamber and the cylinder space is established when the passageway of the valve member registers with said chamber ports, and the communication between said combustion or holding chamber and the cylinder space is blocked when the passageway moves away from the chamber ports.

22. The engine as described in claims 1, 6, or 16, wherein said combustion chamber valve or holding chamber valve is a rotary valve assembly, said rotary valve assembly being preferably disposed in a peripheral location of the piston and cylinder assembly and comprising a chamber having a port in communication with the combustion or holding chamber and a port in communication with the cylinder space, a rotary valve member being disposed within said valve chamber, said valve member having a passageway allowing a fluid to flow through said valve member, and a valve actuator being capable of producing a reciprocating rotation of said valve member, said valve actuator being a mechanical driver in connection with a camshaft driven by an engine crankshaft, an electromagnetic solenoid driver, a hydraulic system driver, an electro-hydraulic system driver, or a combination of a camshaft driver, an electromagnetic driver, and a hydraulic driver, said driver being capable of producing a rotating motion in conjunction with a motion conversion mechanism, wherein the communication between said combustion or holding chamber and said cylinder space is established when the passageway of the valve member registers with said chamber ports, and the communication between said combustion or holding chamber and the cylinder space is blocked when the passageway rotates away from the chamber ports.

23. The engine as described in claims 21 or 22, wherein the port between the valve assembly chamber and the cylinder space is substantially filled by a portion of the piston top face when the piston reaches the top dead center.

24. The engine as described in claims 21 or 22, wherein a sealing ring pack is provided in a valve member, said sealing ring pack being mounted in a valve member area facing a valve-chamber port leading to either the combustion chamber or the cylinder space when the valve member is in a position to block the communication between the combustion chamber and the cylinder space, so that gas leakage between the combustion chamber and the cylinder space is substantially reduced.

25. The engine as described in claims 21 or 22, wherein a heat pipe is installed in a slide valve along the longitudinal direction of a reciprocating valve member, or installed in a rotary valve along the circumference of a rotating valve member, said heat pipe being a reciprocating heat pipe, to enhance the localized cooling and reduce the maximum temperature of a valve member.

26. The engine as described in claims 21 or 22, wherein an amount of working fluid, such as a liquid metal, is filled within a cavity along the longitudinal direction of a reciprocating valve member in a slide valve or a cavity along the circumference of a rotating valve member in a rotary valve, to enhance the localized cooling and reduce the maximum temperature of a valve member.

* * * * *